(12) United States Patent  (10) Patent No.: US 7,849,397 B1
Ahmed  (45) Date of Patent: Dec. 7, 2010

(54) SYSTEM AND METHOD FOR PROVIDING ELECTRONIC DATA ENTRY FORMS WITH TRAINABLE DATA FIELD SEQUENCING

(75) Inventor: Shahid Ahmed, Bangalore (IN)

(73) Assignee: Intuit Inc., Mountain View, CA (US)

( * ) Notice: Subject to any disclaimer, the term of this patent is extended or adjusted under 35 U.S.C. 154(b) by 711 days.

(21) Appl. No.: 11/734,676

(22) Filed: Apr. 12, 2007

(51) Int. Cl.
*G06F 17/24* (2006.01)

(52) U.S. Cl. .................. 715/224; 715/226; 715/221

(58) Field of Classification Search .............. 715/221, 715/222, 223, 224, 225, 226
See application file for complete search history.

(56) References Cited

U.S. PATENT DOCUMENTS

| | | | | |
|---|---|---|---|---|
| 5,228,137 A | * | 7/1993 | Kleinerman et al. | 703/26 |
| 5,640,501 A | * | 6/1997 | Turpin | 715/224 |
| 6,084,585 A | * | 7/2000 | Kraft et al. | 715/733 |
| 7,290,220 B2 | * | 10/2007 | Bhogal et al. | 715/827 |
| 7,313,759 B2 | * | 12/2007 | Sinisi | 715/234 |

* cited by examiner

*Primary Examiner*—Stephen S Hong
*Assistant Examiner*—I-Chan Yang
(74) *Attorney, Agent, or Firm*—Gunnison, McKay & Hodgson, L.L.P.; Philip J. McKay

(57) ABSTRACT

A system and method for providing electronic data entry forms with trainable data field sequencing includes a computing system implemented process for providing electronic data entry forms with trainable data field sequencing whereby as data fields are accessed in a specific sequence by a user to enter data associated with a first item, the specific sequence in which the data entry fields are accessed is learned/stored. Then the data fields are accessed in the same specific sequence for data entry associated with all subsequent items until the trainable data field sequencing feature is deactivated.

30 Claims, 20 Drawing Sheets

|     | 405 | 407 | 409 | 410 |
|-----|-----|-----|-----|-----|
| 403 | ITEM NAME | DATA 3 | DATA 1 | DATA 5 |
| 411 | ITEM 1 | ITEM 1/ DATA 3 | ITEM 1/ DATA 1 | ITEM 1/ DATA 5 |
| 413 | ITEM 2 | ITEM 2/ DATA 3 | ITEM 2/ DATA 1 | ITEM 2/ DATA 5 |
| 415 | ITEM 3 | ITEM 3/ DATA 3 | ITEM 3/ DATA 1 | ITEM 3/ DATA 5 |

SYSTEM AND METHOD FOR PROVIDING ELECTRONIC DATA ENTRY FORMS WITH TRAINABLE DATA FIELD SEQUENCING

BACKGROUND

As computing systems have come to dominate both the office and home environments, users of the computing system implemented processes are demanding more speed, efficiency and ease of use from these processes.

One source of inefficiency in many currently used computing system implemented processes is the fact that many processes include electronic data entry forms that require a user to sequence, by tabbing or some similar action, through multiple data entry fields in order to access a desired data entry field. The need to sequence through multiple data entry fields in order to access the desired data entry field is typically only a minor nuisance when data is being entered/accessed for only one item. However, when data associated with several items, or even hundreds of items, is being entered, this process becomes quite tedious and time consuming.

As a specific example, consider the case of a computing system implemented inventory management system. In this specific example, we stipulate that the computing system implemented inventory management system includes an electronic data entry form where data must be entered for each inventory item that is to be tracked/processed using the computing system implemented inventory management system. In this specific example, we will further stipulate that the data fields of the computing system implemented inventory management system electronic data entry form are accessed by either specific individual selection, using a user interface device such as a mouse, or by tabbing through the data fields using the tab key, space bar, or other designated key on a keyboard. It is worth noting that the tabbing option would typically be used most because this allows for both accessing of the data fields and data entry using a single user interface device, e.g., a keyboard, and does not require the user to lose his or her focus and/or context in order to manipulate a mouse or other second user interface device.

For this specific example, we further stipulate that the data entry fields of the electronic data entry form are accessed by tabbing in the following specific sequence: item name; item description; item category; item unit price; related items; quantity of items in inventory; manufacturer part number; and item serial number.

In this specific example, assume the user has taken delivery of 100 units of inventory. In this specific example, we further stipulate that an itemized shipping list is included with the delivery listing each item individually, along with data for each item that is to be entered into the computing system implemented inventory management system. It is further stipulated that the shipping list includes the following information about each item, listed in the following order: serial number of the item; manufacturer part number; name of the item; the item category; and item unit price.

Using the example above, the user of the computing system implemented inventory management system would have to perform the following steps to transfer/enter data from the shipping list into the computing system implemented inventory management system:

1. Tab through each of the data entry fields for: item name; item description; item category; item unit price; related items; quantity of items in inventory; and manufacturer part number to access the serial number data entry field and enter the item serial number, (7 tabbing actions);

2. Tab through each of the data entry fields for: serial number; item name; item description; item category; item unit price; related items; and quantity of items in inventory to access the manufacturer part number data entry field and enter the manufacturer part number data (7 tabbing actions);

3. Tab through each of the data entry fields for manufacturer part number and item serial number to access the item name data entry field and enter the item name data (2 tabbing actions);

4. Tab through each of the data entry fields for item name and item description to access the item category data field and enter the item category data (2 tabbing actions); and 5. Tab through the data entry field for the item category to access the item unit price data entry field and enter the item unit price data (1 tabbing action).

Consequently, even in the very simple example shown above, the user must perform 19 tabbing actions to enter the data for a single item of inventory. This equates to at least 1900 tabbing actions for the 100 units of inventory that were received in the example above. As cumbersome as this seems, the example above is relatively simple with only five data elements per inventory item. In a real world example, there could be 10 or 20 data fields per inventory item and it is not uncommon for the number of inventory items to be in the thousands. Consequently, as noted above, while these sequencing/tabbing actions might be ignorable singly, collectively they can be quite burdensome and a significant source of inefficiency, not to mention a significant source of carpel tunnel syndrome, workman's compensation claims and lost/wasted man-hours.

SUMMARY

In accordance with one embodiment, a system and method for providing electronic data entry forms with trainable data field sequencing provides a user with a trainable electronic data entry form whereby as data fields are accessed by the user in a specific sequence to enter data associated with a first item, the specific sequence in which the data entry fields are accessed is learned/stored. Then, in one embodiment, the data fields are accessed directly in the same specific sequence for data entry associated with all subsequent items automatically until the trainable data field sequencing feature is deactivated.

In one embodiment, a system and method for providing electronic data entry forms with trainable data field sequencing includes a process for providing electronic data entry forms with trainable data field sequencing that is activated by a predetermined user action. In one embodiment, once the trainable data field sequencing feature is activated, a user enters the data associated with a first item by tabbing, or otherwise accessing, the individual data entry fields in the desired/necessary sequence as is done using currently available systems/processes.

In one embodiment, as the data entry fields are accessed in the desired/necessary sequence, the specific data entry field access sequence is memorized by the process for providing electronic data entry forms with trainable data field sequencing. In one embodiment, data representing the specific data entry field access sequence is then stored. In one embodiment, once the specific data entry field access sequence is stored, as long as the trainable data field sequencing feature is activated, the data fields are accessed in the same specific sequence for data entry associated with all other subsequent items and data is entered in a given data entry field as the data entry fields are accessed.

In one embodiment, once a given specific data entry field access sequence is obtained and stored for a given electronic data entry form, it can be activated and deactivated as needed. In one embodiment, the specific sequence in which the data entry fields are accessed for a given electronic data entry form is linked to the specific electronic data entry form so that the specific sequence in which the data entry fields are accessed for that form become available each time the form is used/activated. In one embodiment, multiple specific data entry field access sequences for multiple electronic data entry forms are obtained and stored according to the needs of the user.

Using the system and method for providing electronic data entry forms with trainable data field sequencing disclosed herein, the user is no longer required to repetitively sequence, or tab, through multiple data entry fields in order to access a desired data entry field for each item entered into a data base and/or computing system implemented process. Consequently, using the system and method for providing electronic data entry forms with trainable data field sequencing disclosed herein, a significant source of inefficiency and lost/wasted man-hours is eliminated.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 4 shows a representation of an exemplary data listing for multiple items;

Figure 1:
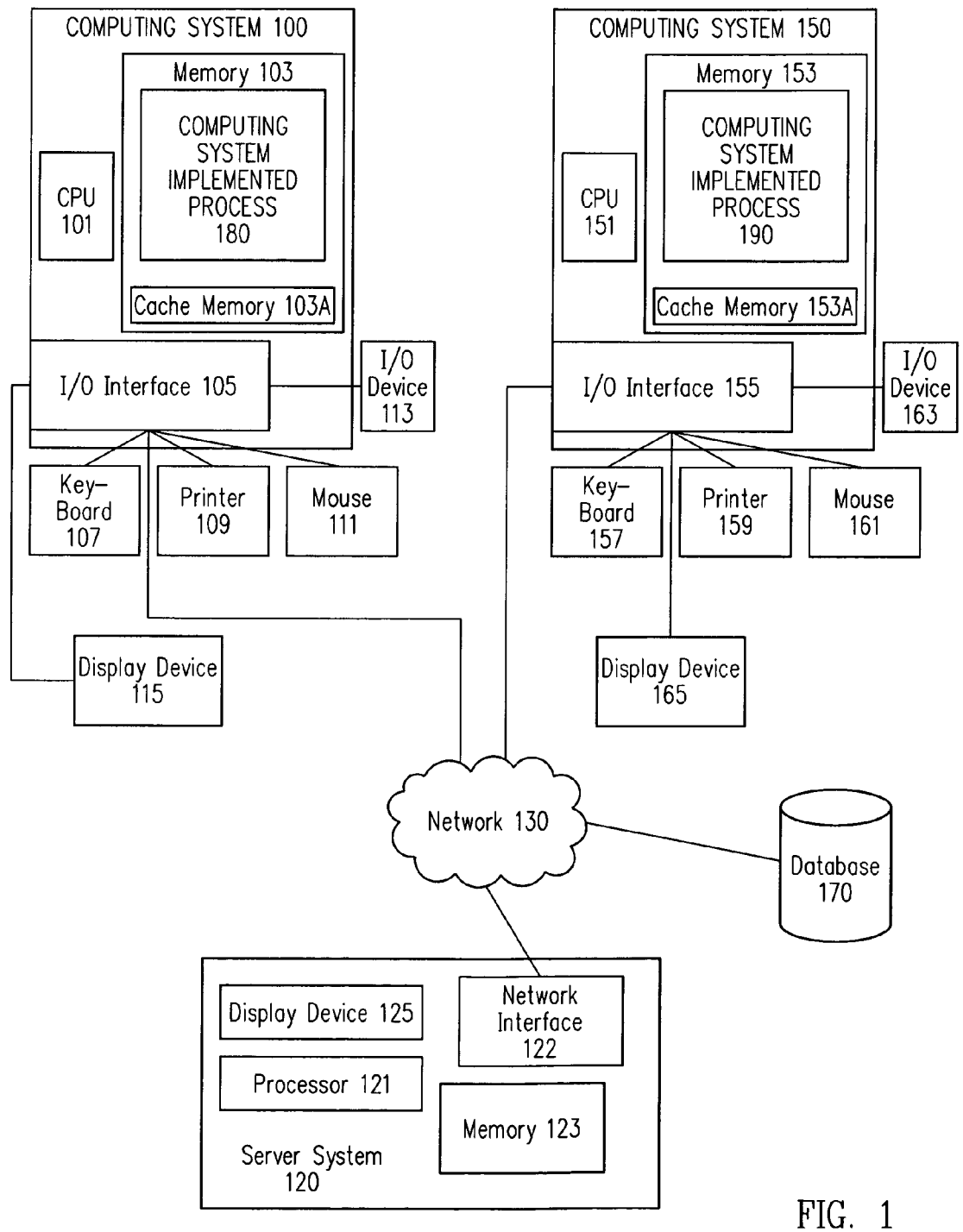
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing electronic data entry forms with trainable data field sequencing provides a user with a trainable electronic data entry form whereby as data fields are accessed by the user in a specific sequence to enter data associated with a first item, the specific sequence in which the data entry fields are accessed is learned/stored. Then, in one embodiment, the data fields are accessed directly in the same specific sequence for data entry associated with all subsequent items automatically until the trainable data field sequencing feature is deactivated.

In one embodiment, a system and method for providing electronic data entry forms with trainable data field sequencing includes a process for providing electronic data entry forms with trainable data field sequencing that is activated by a predetermined user action. In one embodiment, once the trainable data field sequencing feature is activated, a user enters the data associated with a first item by tabbing, or otherwise accessing, the individual data entry fields in the desired/necessary sequence as is done using currently available systems/processes.

In one embodiment, as the data entry fields are accessed in the desired/necessary sequence, the specific data entry field access sequence is memorized by the process for providing electronic data entry forms with trainable data field sequencing. In one embodiment, data representing the specific data entry field access sequence is then stored. In one embodiment, once the specific data entry field access sequence is stored, as long as the trainable data field sequencing feature is activated, the data fields are accessed in the same specific sequence for data entry associated with all other subsequent items and data is entered in a given data entry field as the data entry fields are accessed.

In one embodiment, once a given specific data entry field access sequence is obtained and stored for a given electronic data entry form, it can be activated and deactivated as needed. In one embodiment, the specific sequence in which the data entry fields are accessed for a given electronic data entry form is linked to the specific electronic data entry form so that the specific sequence in which the data entry fields are accessed for that form become available each time the form is used/activated. In one embodiment, multiple specific data entry field access sequences for multiple electronic data entry forms are obtained and stored according to the needs of the user.

Using the system and method for providing electronic data entry forms with trainable data field sequencing disclosed herein, the user is no longer required to repetitively sequence, or tab, through multiple data entry fields in order to access a desired data entry field for each item entered into a data base and/or computing system implemented process. Consequently, using the system and method for providing electronic data entry forms with trainable data field sequencing disclosed herein, a significant source of inefficiency and lost/wasted man-hours is eliminated.

As discussed in more detail below, using the below embodiments, with little or no modification and/or user input, there is considerable flexibility, adaptability, and opportunity for customization to meet the specific needs of various users under numerous circumstances.

Some embodiments may be implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments may be implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. As defined herein, computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or any other electronic medium in which data may be exchanged between one computing system and one or more other computing system(s), whether known at the time of filing or as developed later. Embodiments may be included as add-on or plug-in software for existing software programs, packages or applications, and embodiments may be a feature of an application that is bundled with a computing system or sold/provided separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for providing electronic data entry forms with trainable data field sequencing, such as exemplary process 200 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, one or more computing system implemented processes 180 stored, in whole, or in part, therein, that is a parent system for, is used by, or includes, as discussed below, a process for providing electronic data entry forms with trainable data field sequencing, such as exemplary process 200 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing electronic data entry forms with trainable data field sequencing and/or a computing system implemented process can be loaded, in whole, or in part, into computing system 100 via I/O device 113, such as from a CD, DVD, floppy disk or other medium.

Similarly, computing system 150 typically includes a CPU 151, an input/output (I/O) interface 155, and a memory system 153, including cache memory 153A. In one embodiment, memory system 153 includes all, or part of, one or more computing system processes 190 stored, in whole, or in part, therein, that is a parent system for, is used by, or includes, as discussed below, a process for providing electronic data entry forms with trainable data field sequencing.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed. As discussed in more detail below, in one embodiment, a process for providing electronic data entry forms with trainable data field sequencing and/or a computing system implemented process, can be loaded, in whole, or in part, into computing system 150 via I/O device 163, such as from a CD, DVD or floppy disk.

Also shown in FIG. 1 is exemplary database 170. In one embodiment, database 170 is a designated server system or computing system, or a designated portion of one or more server systems or computing systems, such as computing systems 100, 150 and 120 or a distributed database. In one embodiment, database 170 is a dedicated mass storage device implemented in software, hardware, or a combination of hardware and software. In one embodiment, database 170 is a web-based function. As discussed in more detail below, in one embodiment, a process for providing electronic data entry forms with trainable data field sequencing, such as exemplary process 200, and/or computing system implemented processes 180 and/or 190, are stored in whole, or in part, in database 170.

In one embodiment, computing systems 100 and 150, and database 170, are coupled to a server system 120 through network 130. Server system 120 typically includes a server system display device 125, a server system processor 121, a server system memory 123, and a server system network interface 122. As discussed in more detail below, in one embodiment, a process for providing electronic data entry forms with trainable data field sequencing and/or a computing system implemented process are stored and/or operated in whole, or in part, in/on server system 120.

In one embodiment, server system 120 is used and/or accessible by a process for providing electronic data entry forms with trainable data field sequencing provider. In one embodiment, server system 120 is used and/or accessible by a computing system implemented process provider. In one embodiment, server system 120 is used and/or accessible by any designated third party.

Network 130 can be any network or network system that is of interest to a user such as a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via a network, as discussed herein. In addition, the particular type of, and configuration of, computing systems 100 and 150, database 170, and server system 120 are not relevant.

As discussed in more detail below, in one embodiment, a process for providing electronic data entry forms with trainable data field sequencing and/or a computing system implemented process are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing electronic data entry forms with trainable data field sequencing and/or a computing system implemented process, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing electronic data entry forms with trainable data field sequencing and/or a computing system implemented process is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process for providing electronic data entry forms with trainable data field sequencing by CPU 101, CPU 151, or server system processor 121, results in the operations of an agent computer process (not shown) and/or a rule computer process (not shown).

In one embodiment, a process for providing electronic data entry forms with trainable data field sequencing and/or a computing system implemented process are computer applications or processes implemented and/or run and/or stored, in full, or in part, in, or on, a computer program product. Herein, a computer program product comprises a medium configured to store or transport computer readable code, whether available or known at the time of filing or as later developed. Some examples of computer program products are CDs, DVDs, ROM cards, floppy discs, magnetic tapes, computer hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable from the computing system.

For example, all, or part, of a process for providing electronic data entry forms with trainable data field sequencing and/or a computing system implemented process may be stored in a memory that is physically located in a location, such as server system memory 123, or database 170, of FIG. 1, different from a computing system, such as computing systems 100 and/or 150 of FIG. 1, utilizing a process for providing electronic data entry forms with trainable data field sequencing and/or a computing system implemented process. In one embodiment, all, or part, of a process for providing electronic data entry forms with trainable data field sequencing and/or a computing system implemented process may be stored in a memory that is physically located, separate from the computing system's processor(s), such as CPUs 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for providing electronic data entry forms with trainable data field sequencing and/or a computing system implemented process, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for providing electronic data entry forms with trainable data field sequencing and/or a computing system implemented process, discussed herein, in accordance with at least one of the embodiments as described herein. Similarly, in another embodiment, a process for providing electronic data entry forms with trainable data field sequencing and/or a computing system implemented process, discussed herein, may be implemented on and/or run and/or stored on a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

In one embodiment, computer programs, algorithms and routines are envisioned to be programmed in a high level language object oriented language, for example Java™, C, C++, C#, CORBA, Visual Basic™. In one embodiment, database components may utilize any common database program, by way of example and not limitation, ORACLE™, Sequel Server™, MySQL™, SQL™, MS ACCESS™, DB2™, MS FOXBASE™, DBASE™, PostgreSQL™ and RBASE™. For purposes of this specification, the term "program" is intended to be interpreted in its broadest sense to include all instructions executable by a processor whether embodied in programmable hardware (e.g., EEPROM) or software disposed on a computer program product, as defined herein. Where applicable, references to various programs may be made in both singular and plural form. No limitation is intended by such grammatical usage as one skilled in the art will appreciate that multiple programs, objects, subprograms, subroutines, algorithms, applets, contexts, etc. may be implemented programmatically to implement the various inventive embodiments.

Process

Herein, the term "user" denotes any individual party or organization implementing and/or interfacing with a system and method for providing electronic data entry forms with trainable data field sequencing and/or a process for providing electronic data entry forms with trainable data field sequencing as disclosed herein.

Herein the terms "electronic data entry form", "data entry form", "interface" or "user interface" or "interface display" are used interchangeably to denote a display on any display device, as an example, display devices 115, 165, 125 of FIG. 1, of any computing system and/or device, as an example, computing systems 100, 150 and server system 120 of FIG. 1, that provides a user with the ability to access/enter/interact with data using a user interface device or mechanism, whether known at the time of filing or as developed thereafter. Herein, the terms "electronic data entry form", "data entry form", "interface" or "user interface" or "interface display" refer to both standard electronic data entry forms and web-based data entry forms.

In accordance with one embodiment, a system and method for providing electronic data entry forms with trainable data field sequencing provides a user with a trainable electronic data entry form whereby as data fields are accessed in a specific sequence to enter data associated with a first item, the specific sequence in which the data entry fields are accessed is learned/stored. Then, in one embodiment, the data fields are accessed in the same specific sequence for data entry associated with all subsequent items until the trainable data field sequencing feature is deactivated.

Figure 2:
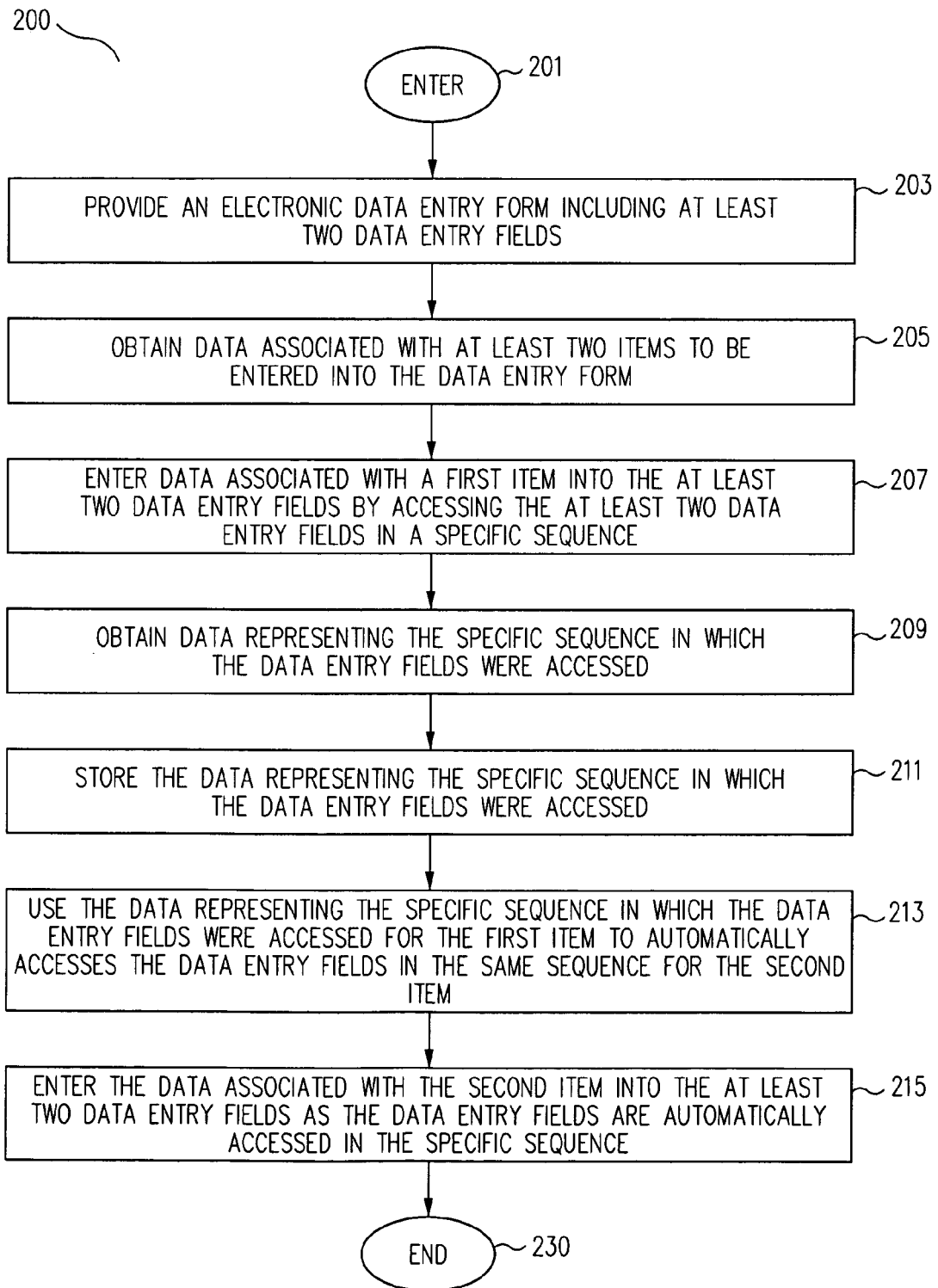
FIG. 2 is a flow chart depicting a process for providing electronic data entry forms with trainable data field sequencing in accordance with one embodiment.

FIG. 2 a flow chart depicting a process for providing electronic data entry forms with trainable data field sequencing 200 in accordance with one embodiment. Process for providing electronic data entry forms with trainable data field sequencing 200 begins at ENTER OPERATION 201 of FIG. 2 and process flow proceeds to PROVIDE AN ELECTRONIC DATA ENTRY FORM INCLUDING AT LEAST TWO DATA ENTRY FIELDS OPERATION 203.

In one embodiment, at PROVIDE AN ELECTRONIC DATA ENTRY FORM INCLUDING AT LEAST TWO DATA ENTRY FIELDS OPERATION 203 a computing system implemented process is provided, such as computing system processes 180 and/or 190 of FIG. 1, that includes an electronic data entry form for entering data associated with items and/or item listings processed and/or used by the computing system implemented process.

As discussed above, the computing system implemented process of PROVIDE AN ELECTRONIC DATA ENTRY FORM INCLUDING AT LEAST TWO DATA ENTRY FIELDS OPERATION 203 is sometimes referred to herein, alternatively, as a process, an application, a module, a program, a component of a software system, a component of a software package, a component of a parent system, a plug-in, or a feature of a parent system. In some embodiments, the computing system implemented process of PROVIDE AN ELECTRONIC DATA ENTRY FORM INCLUDING AT LEAST TWO DATA ENTRY FIELDS OPERATION 203 is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121 (FIG. 1). In one embodiment, execution of a process for providing electronic data entry forms with trainable data field sequencing by CPU 101, CPU 151, or server system processor 121, results in the operations of an agent computer process (not shown) and/or a rule computer process (not shown).

Returning to FIG. 2, in one embodiment, the computing system implemented process of PROVIDE AN ELECTRONIC DATA ENTRY FORM INCLUDING AT LEAST TWO DATA ENTRY FIELDS OPERATION 203 is a computer application or processes implemented and/or run and/or stored, in full, or in part, in, or on, a computer program product. As discussed above, herein, a computer program product comprises a medium configured to store or transport computer readable code, whether available or known at the time of filing or as later developed. Some examples of computer program products are CDs, DVDs, ROM cards, floppy discs, magnetic tapes, computer hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable from the computing system.

Returning to FIG. 2, as also discussed above, in one embodiment, the computing system implemented process of PROVIDE AN ELECTRONIC DATA ENTRY FORM INCLUDING AT LEAST TWO DATA ENTRY FIELDS OPERATION 203 is envisioned to be programmed in a high level language object oriented language, for example Java™, C++, C#, CORBA, Visual Basic™. For purposes of this specification, the term "program" and/or "process" is intended to be interpreted in its broadest sense to include all instructions executable by a processor whether embodied in programmable hardware (e.g., EEPROM) or software disposed on a computer program product, as defined herein. Where applicable, references to various programs may be made in both singular and plural form. No limitation is intended by such grammatical usage as one skilled in the art will appreciate that multiple programs, objects, subprograms, subroutines, algorithms, applets, contexts, etc. may be implemented programmatically to implement the various inventive embodiments.

In one embodiment, the computing system implemented process of PROVIDE AN ELECTRONIC DATA ENTRY FORM INCLUDING AT LEAST TWO DATA ENTRY FIELDS OPERATION 203 includes an electronic data entry form. As noted above, herein the terms "electronic data entry form", "data entry form" "interface" or "user interface" or "interface display" are used interchangeably to denote a data entry display on any display device, as an example, display devices 115, 165, 125 of FIG. 1, of any computing system and/or device, as an example, computing systems 100, 150 and server system 120 of FIG. 1.

In one embodiment, the electronic data entry form of PROVIDE AN ELECTRONIC DATA ENTRY FORM INCLUDING AT LEAST TWO DATA ENTRY FIELDS OPERATION 203 is a web-based form that allows data to entered/manipulated on a web-page or other web-based function. In one embodiment, the electronic data entry form of PROVIDE AN ELECTRONIC DATA ENTRY FORM INCLUDING AT LEAST TWO DATA ENTRY FIELDS OPERATION 203 is a standard user interface for proving data to a computing system and/or device, as an example, computing systems 100, 150 and server system 120 of FIG. 1 and/or a database, such as database 170 of FIG. 1.

In one embodiment, the electronic data entry form of PROVIDE AN ELECTRONIC DATA ENTRY FORM INCLUDING AT LEAST TWO DATA ENTRY FIELDS OPERATION 203, provides the user with the ability to interact with the process of PROVIDE AN ELECTRONIC DATA ENTRY FORM INCLUDING AT LEAST TWO DATA ENTRY FIELDS OPERATION 203 through a user interface device such as a keyboard, mouse, touchpad, or any other device capable of providing user input to a computing system or for translating user actions into computing system operations, whether known at the time of filing or as developed later.

Figure 3:
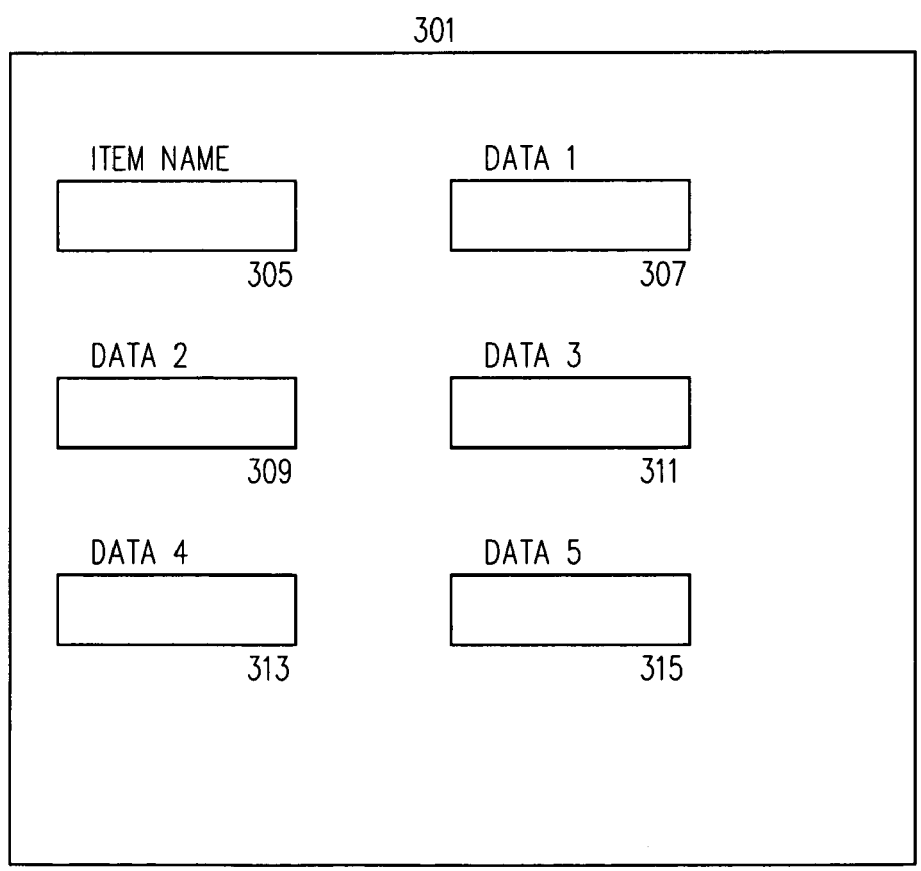
FIG. 3 shows a representation of an exemplary electronic data entry form in accordance with one embodiment.

FIG. 3 shows a representation of an exemplary electronic data entry form 301 including data entry fields 305, 307, 309, 311, 313 and 315. As seen in FIG. 3, data entry field 305 is, in this specific example, an item name data entry field where the name of a given item is entered. As seen in FIG. 3, data entry fields 307, 309, 311, 313 and 315 are data entry fields for entering specific data such as, data 1, data 2, data 3, data 4 and data 5, respectively. The type of data entered as data 1, data 2, data 3, data 4 and data 5 will vary considerably from process-to-process and application-to-application. For instance, in various embodiments data 1, data 2, data 3, data 4 and data 5 can be item name; item description; item category; item unit price; related items; quantity of items in inventory; manufacturer part number; item serial number; stock number; telephone numbers; contact addresses; or virtually any data the user and/or the provider of the computing system implemented process desires.

In one embodiment, data entry fields 307, 309, 311, 313 and 315 are accessed by either specific individual selection, using a user interface device such as a mouse, or by tabbing through the data fields using the tab key, space bar, or other designated key on a keyboard, or any other user action, such as a voice command etc. As discussed above, it is worth noting that the tabbing option would typically be used most because this allows for both accessing of the data fields and data entry using a single user interface device, e.g., a keyboard, and does not require the user to lose his or her focus and/or context in order to manipulate a mouse or other second user interface device.

In the specific example of exemplary electronic data entry form 301, absent the present invention, the user would tab through data entry fields 307, 309, 311, 313 and 315 in the listed order so that data entry fields 307, 309, 311, 313 and 315 would be accessed sequentially for entry of data 1, data 2, data 3, data 4 and data 5, respectively.

Methods, mechanisms, processes and procedures for creating, displaying, and operating electronic data entry forms are well known to those of skill in the art. Consequently, a more detailed discussion of the methods, mechanisms, processes and procedures for creating, displaying and operating electronic data entry forms, such as exemplary electronic data entry form 301, are omitted here to avoid detracting from the invention.

Those of skill in the art will readily recognize that exemplary electronic data entry form 301 is an illustrative example and that the layout, arrangement, display, and organization of the information, including the number of data entry fields shown, was made for illustrative purposes only and in no way limits the invention as claimed below.

In one embodiment, once a computing system implemented process is provided that includes an electronic data entry form for entering data associated with items and/or item listings processed and/or used by the computing system implemented process at PROVIDE AN ELECTRONIC DATA ENTRY FORM INCLUDING AT LEAST TWO DATA ENTRY FIELDS OPERATION 203, process flow proceeds to OBTAIN DATA ASSOCIATED WITH AT LEAST TWO ITEMS TO BE ENTERED INTO THE DATA ENTRY FORM OPERATION 205.

In one embodiment, at OBTAIN DATA ASSOCIATED WITH AT LEAST TWO ITEMS TO BE ENTERED INTO THE DATA ENTRY FORM OPERATION 205 data associated with two or more items is obtained through any one of numerous methods for obtaining data associated with an item.

The two or more items with which the data is associated will vary considerably from application-to-application and process-to-process. In various embodiments, the items can be inventory items, contacts, people, addresses, dates, events, and/or virtually any items and/or listings desired.

In one embodiment, the data associated with two or more items is obtained in printed form, such as a sales receipt, invoice, or packing slip. In one embodiment, the data associated with two or more items is obtained in electronic form, such as an electronic receipt, invoice, or packing slip, an e-mail, a website, or in the form of a computer program product as defined herein. In one embodiment, there is at least partial overlap between the data associated with two or more items of OBTAIN DATA ASSOCIATED WITH AT LEAST TWO ITEMS TO BE ENTERED INTO THE DATA ENTRY FORM OPERATION 205 and the data of data entry fields data entry fields 307, 309, 311, 313 and 315 of the electronic data entry form of PROVIDE AN ELECTRONIC DATA ENTRY FORM INCLUDING AT LEAST TWO DATA ENTRY FIELDS OPERATION 203. As discussed in more detail below, in one embodiment, the user desires to transfer/enter the data associated with two or more items of OBTAIN DATA ASSOCIATED WITH AT LEAST TWO ITEMS TO BE ENTERED INTO THE DATA ENTRY FORM OPERATION 205 to/into electronic data entry form of PROVIDE AN ELECTRONIC DATA ENTRY FORM INCLUDING AT LEAST TWO DATA ENTRY FIELDS OPERATION 203.

FIG. 4 shows a representation of an exemplary data listing 400 for multiple items Item 1, Item 2 and Item 3. In the specific example of FIG. 4, exemplary electronic data entry form 400 includes: heading row 403; item 1 row 411; item 2 row 413 and item 3 row 415.

In this specific example, heading row 403 includes column headings item name 405, data 3 column 407, data 1 column 409 and data 5 column 410. In this specific example, each item listed in item rows 411, 413 and 415 includes its own entry for item name 405, data 3, data 1 and data 5. Consequently, as seen in FIG. 4, in this specific example, each of the items listed in item 1 row 411, item 2 row 413, and item 3 row 415 includes its own entry in columns 407, 409 and 410 so that ITEM 1 of item 1 row 411 includes ITEM 1/DATA 3 in column 407, ITEM 1/DATA 1 in column 409 and ITEM 1/DATA 5 in column 410. Likewise, ITEM 2 of item 2 row 413 includes ITEM 2/DATA 3 in column 407, ITEM 2/DATA 1 in column 409 and ITEM 2/DATA 5 in column 410. Likewise, ITEM 3 of item 3 row 415 includes ITEM 3/DATA 3 in column 407, ITEM 3/DATA 1 in column 409 and ITEM 3/DATA 5 in column 410.

In one embodiment: the data entered as data 3, i.e., ITEM 1/DATA 3, ITEM 2/DATA 3 and ITEM 3/DATA 3; the data entered as data 1, i.e., ITEM 1/DATA 1, ITEM 2/DATA 1 and ITEM 3/DATA 1; and the data entered as data 5, i.e., ITEM 1/DATA 5, ITEM 2/DATA 5 and ITEM 3/DATA 5 will vary significantly from process-to-process and item listing-to-item listing. However, in this example: the data 3 data, i.e., ITEM 1/DATA 3, ITEM 2/DATA 3 and ITEM 3/DATA 3, of exemplary data listing 400 is the same data to be entered as data 3 of data entry field 311 of exemplary electronic data entry form 301; the data 1 data, i.e., ITEM 1/DATA 1, ITEM 2/DATA 1 and ITEM 3/DATA 1 of exemplary data listing 400 is the same data to be entered as data 1 of data entry field 307 of exemplary electronic data entry form 301; and the data 5 data, i.e., ITEM 1/DATA 5, ITEM 2/DATA 5 and ITEM 3/DATA 5 of exemplary data listing 400 is the same data to be entered as data 5 of data entry field 315 of exemplary electronic data entry form 301. Consequently, as mentioned above, in one embodiment, the user wishes to: transfer/enter the data 3 data in column 407 of exemplary data listing 400 to data entry field 311 of exemplary electronic data entry form 301; transfer/enter the data 1 data in column 409 of exemplary data listing 400 to data entry field 307 of exemplary electronic data entry form 301; and transfer/enter the data 4 data in column 410 of exemplary data listing 400 to data entry field 315 of exemplary electronic data entry form 301, for an exemplary electronic data entry form 301 associated with each of the items listed in item 1 row 411; item 2 row 413 and item 3 row 415.

Some examples of ITEM 1/DATA 3, ITEM 2/DATA 3 and ITEM 3/DATA 3, ITEM 1/DATA 1, ITEM 2/DATA 1 and ITEM 3/DATA 1, ITEM 1/DATA 5, ITEM 2/DATA 5 and ITEM 3/DATA 5 of exemplary data listing 400 can include, but is not limited to: stock numbers; part numbers; inventory counts; descriptions of the items; listings or related items; names; phone numbers; addresses; contact information; e-mail addresses; and/or any information desired by the provider of the parent process or the user.

Those of skill in the art will readily recognize that exemplary data listing 400 is an illustrative example and that the layout, arrangement, display, and organization of the information, including the number of rows and columns shown, was made for illustrative purposes only and in no way limits the invention as claimed below.

Returning to FIG. 2, in one embodiment, once data associated with two or more items is obtained through any one of numerous methods for obtaining data associated with an item at OBTAIN DATA ASSOCIATED WITH AT LEAST TWO ITEMS TO BE ENTERED INTO THE DATA ENTRY FORM OPERATION 205, process flow proceeds to ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207.

In one embodiment at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207, the data of OBTAIN DATA ASSOCIATED WITH AT LEAST TWO ITEMS TO BE ENTERED INTO THE DATA ENTRY FORM OPERATION 205 associated with a first item is entered into the electronic data entry form of PROVIDE AN ELECTRONIC DATA ENTRY FORM INCLUDING AT LEAST TWO DATA ENTRY FIELDS OPERATION 203 by sequencing through the data entry fields of the electronic data entry form of PROVIDE AN ELECTRONIC DATA ENTRY FORM INCLUDING AT LEAST TWO DATA ENTRY FIELDS OPERATION 203 in the same manner as is done for entering data associated with all items using currently available systems/processes.

FIGS. 5A to 5M are a representation of an exemplary specific sequence of data entry field access and data entry into exemplary electronic data entry form 301 of FIG. 3 as would be performed for a first item of item 1 row 411 of FIG. 4 in accordance with one embodiment.

Referring to FIGS. 3 and 4 together, it is worth noting that in this specific example, the data, data 3, data 1, and data 5 associated with the specific items, Item 1, Item 2 and Item 3 of exemplary electronic data entry form 400 is listed in the order data 3, data 1, and data 5. In contrast, as discussed above, in this specific example using exemplary electronic data entry form 301, the user would tab through data entry fields 307, 309, 311, 313 and 315 in the listed order so that data 1, data 2, data 3, data 4 and data 5 would be accessed sequentially. As a result, the data listed in exemplary electronic data entry form 400 is not in the same formatting sequence as the access sequence of data entry fields of exemplary electronic data entry form 301. Consequently, a user must sequence, by tabbing or some similar action, through multiple intermediate data entry fields of exemplary electronic data entry form 301 in order to access a the data entry fields in the same sequence as the data is listed in exemplary electronic data entry form 400. This is illustrated in FIGS. 5A to 5M.

Figure 5A:
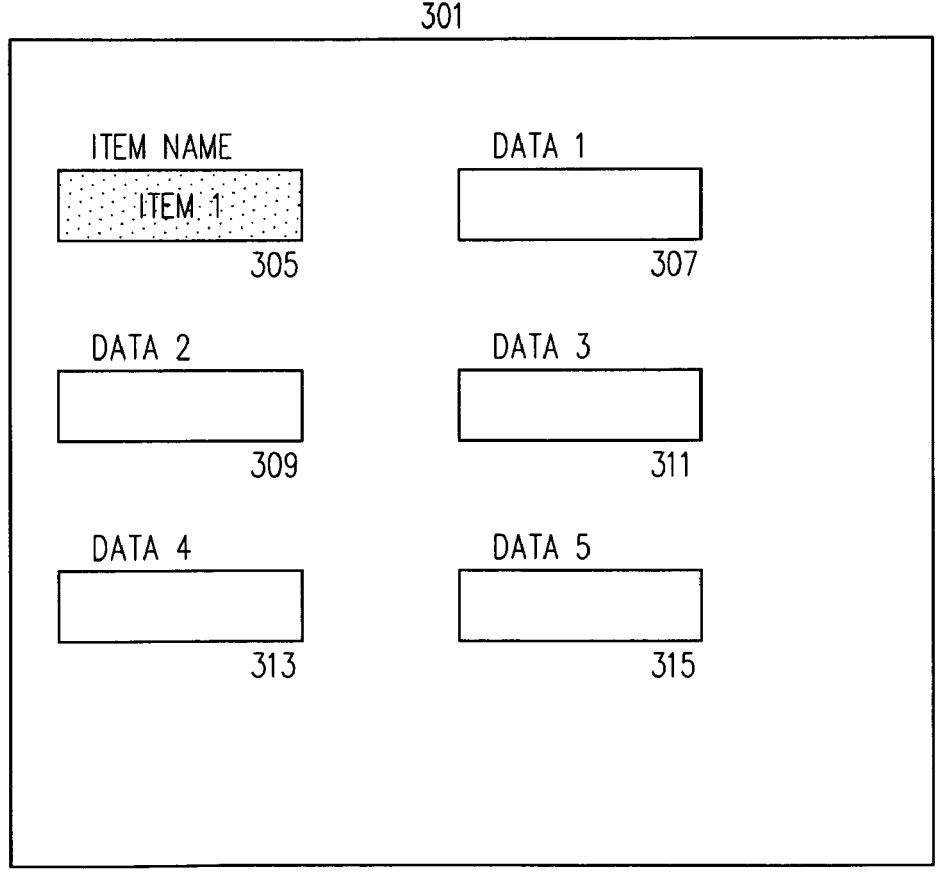
FIGS. 5A to 5H and 5J to 5M are a representation of an exemplary specific sequence of data entry field access and data entry as would be performed for a first item in accordance with one embodiment.
Figure 5B:
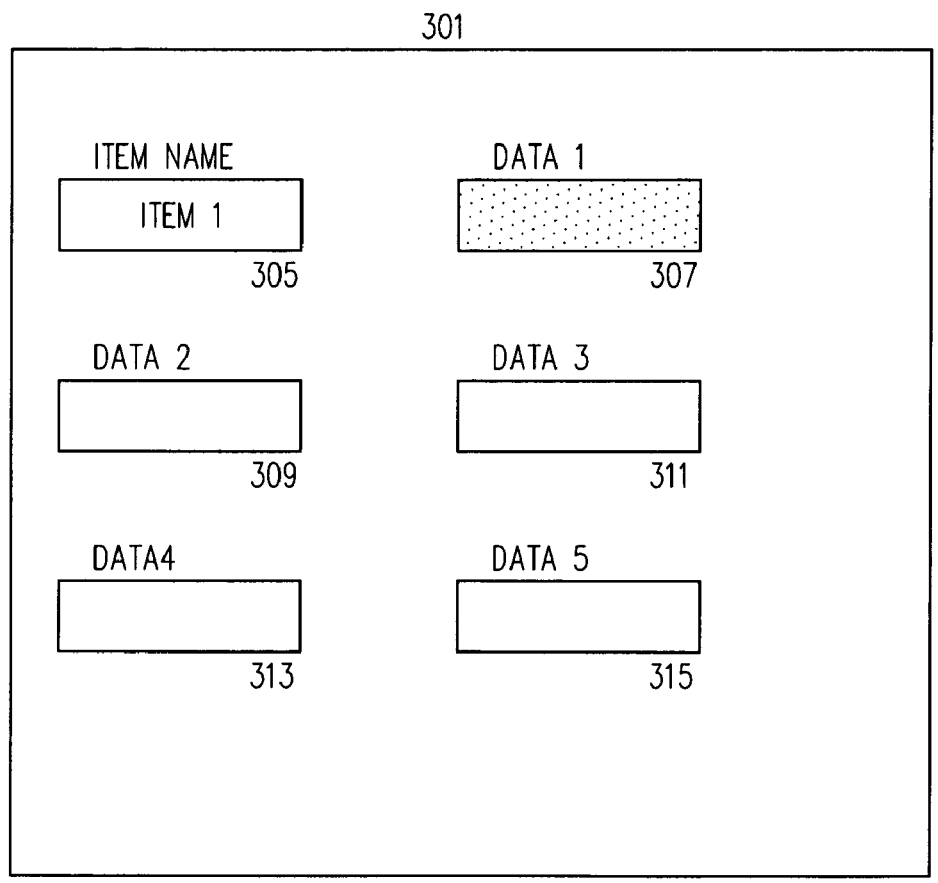
Figure 5C:
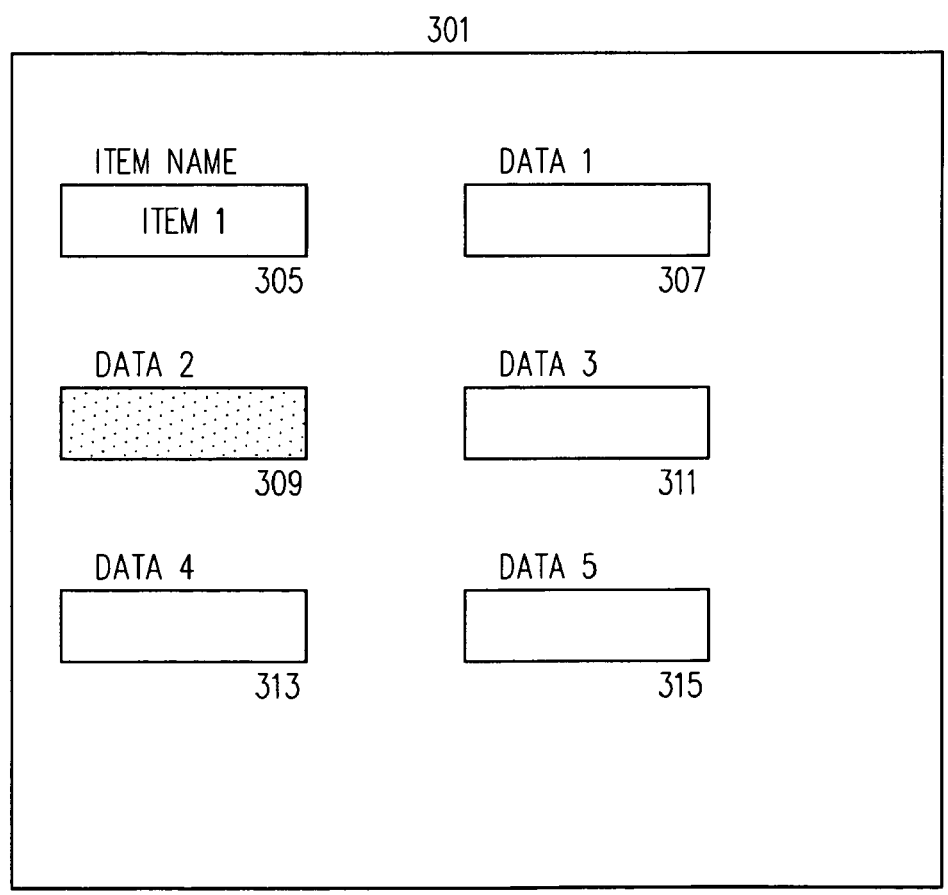

Referring to FIG. 4 and FIG. 5A together, FIG. 5A shows exemplary electronic data entry form 301 including ITEM NAME data entry field 305. As shown in FIG. 5A by the shading, a user has tabbed, or otherwise accessed, ITEM NAME data entry field 305 and has entered the data ITEM 1 from column 405 of item 1 row 411 of FIG. 4. As seen in FIG. 4, the user must next enter the data ITEM 1/DATA 3 of column 405 into data entry field 311 of electronic data entry form 301. To this end, the user must access/select data entry field 311 of exemplary electronic data entry form 301. In one embodiment, this is accomplished by tabbing through data entry field 307 and data entry field 309 of exemplary electronic data entry form 301. This is illustrated in FIGS. 5B and 5C with the accessed data entry fields being shaded.

Figure 5D:
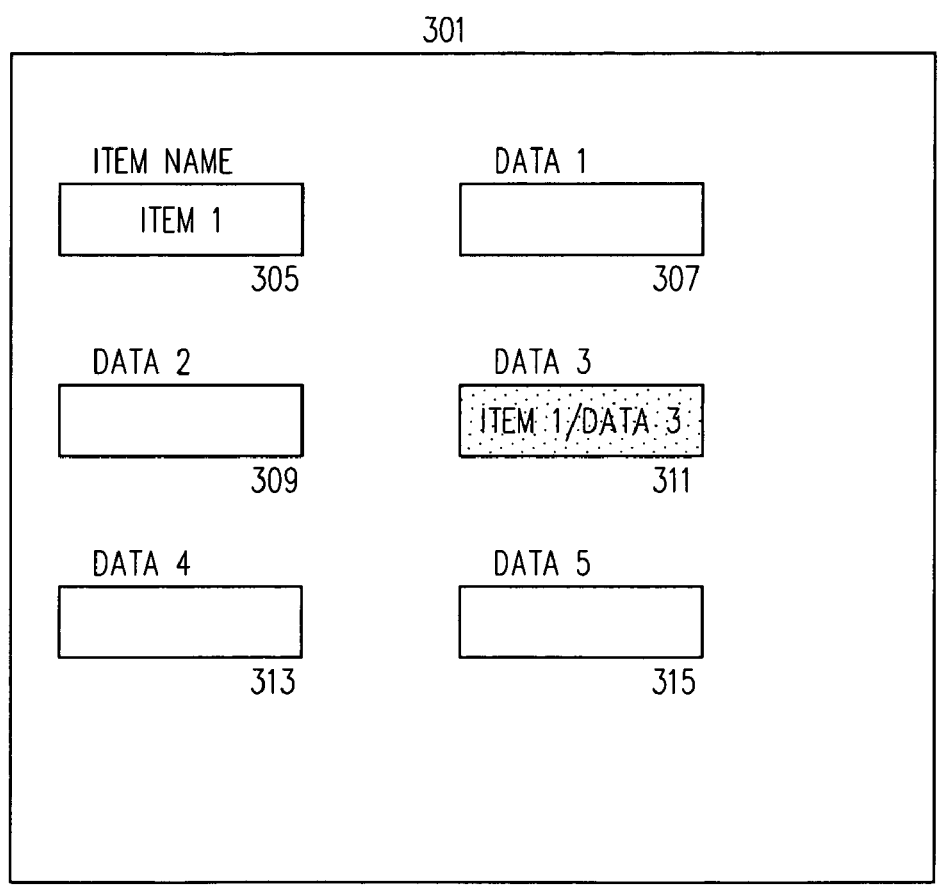
Figure 5E:
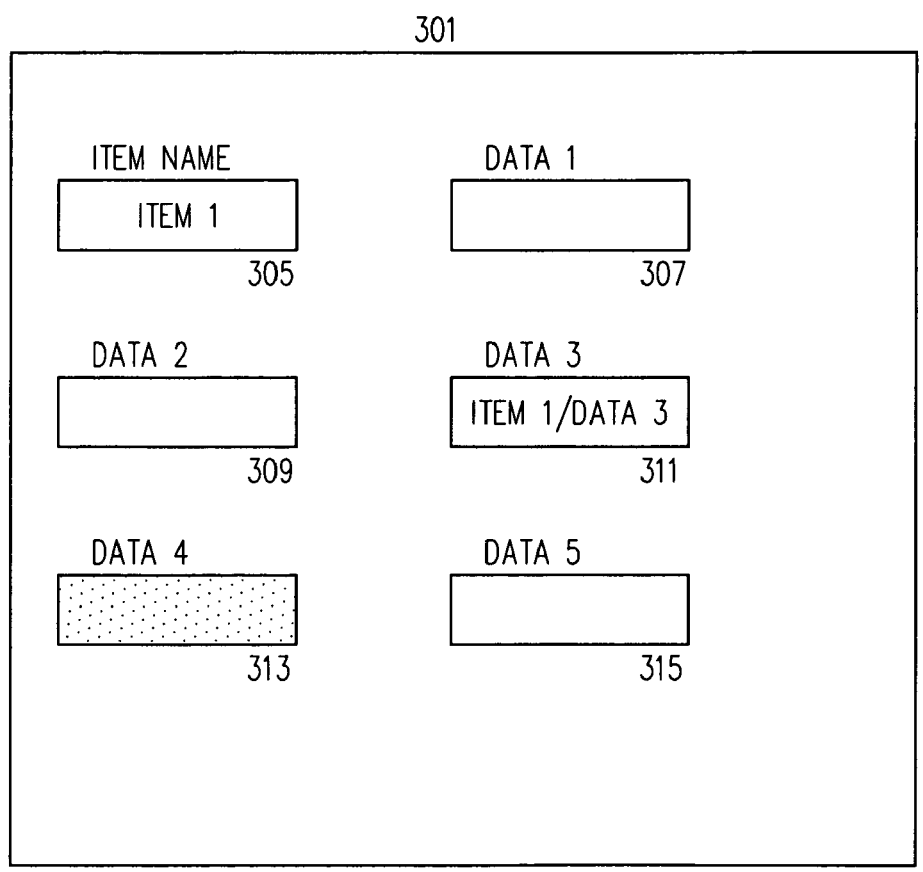
Figure 5F:
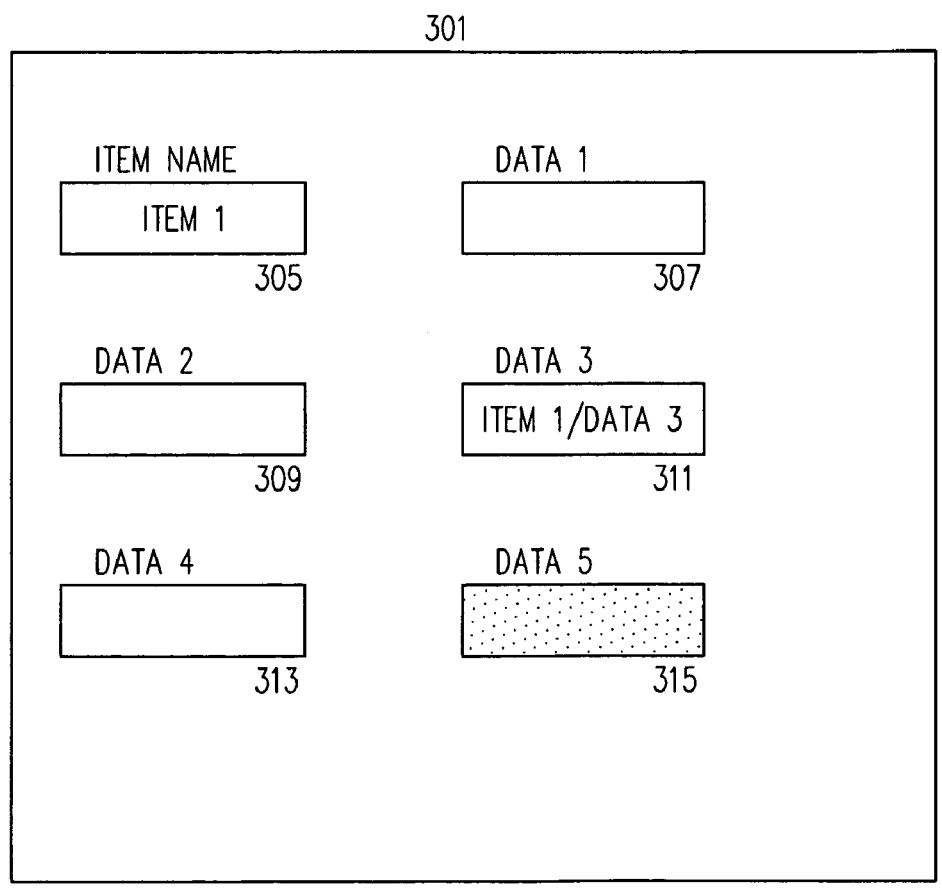
Figure 5G:
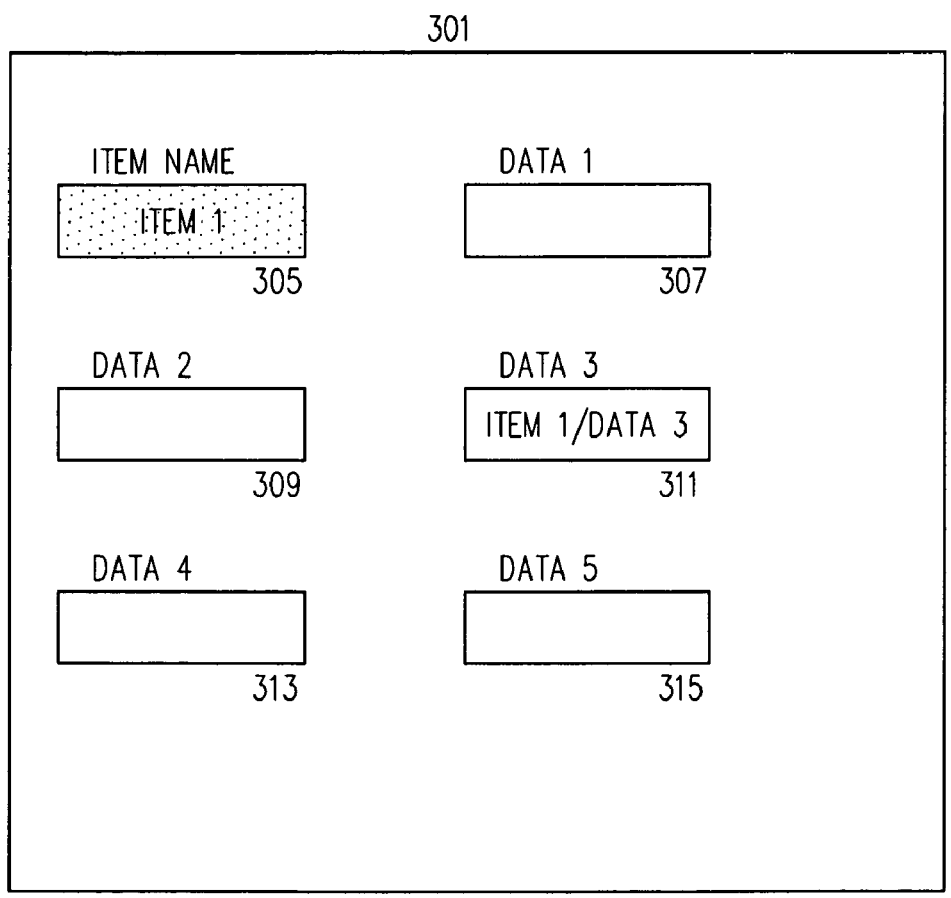

As shown in FIG. 5D by the shading, the user eventually tabs through, or otherwise accesses, DATA 3 entry field 311. The user then enters the data ITEM 1/DATA 3 from column 407 of item 1 row 411 of FIG. 4. As seen in FIG. 4, the user must next enter the data ITEM 1/DATA 1 of column 409 into data entry field 307 of electronic data entry form 301. To this end, the user must access/select data entry field 307 of exemplary electronic data entry form 301. In one embodiment, this is accomplished by tabbing through data entry field 313, data entry field 315, and data entry field 305 of exemplary electronic data entry form 301. This is illustrated in FIGS. 5E, 5F, and 5G with the accessed data entry fields being shaded.

Figure 5H:
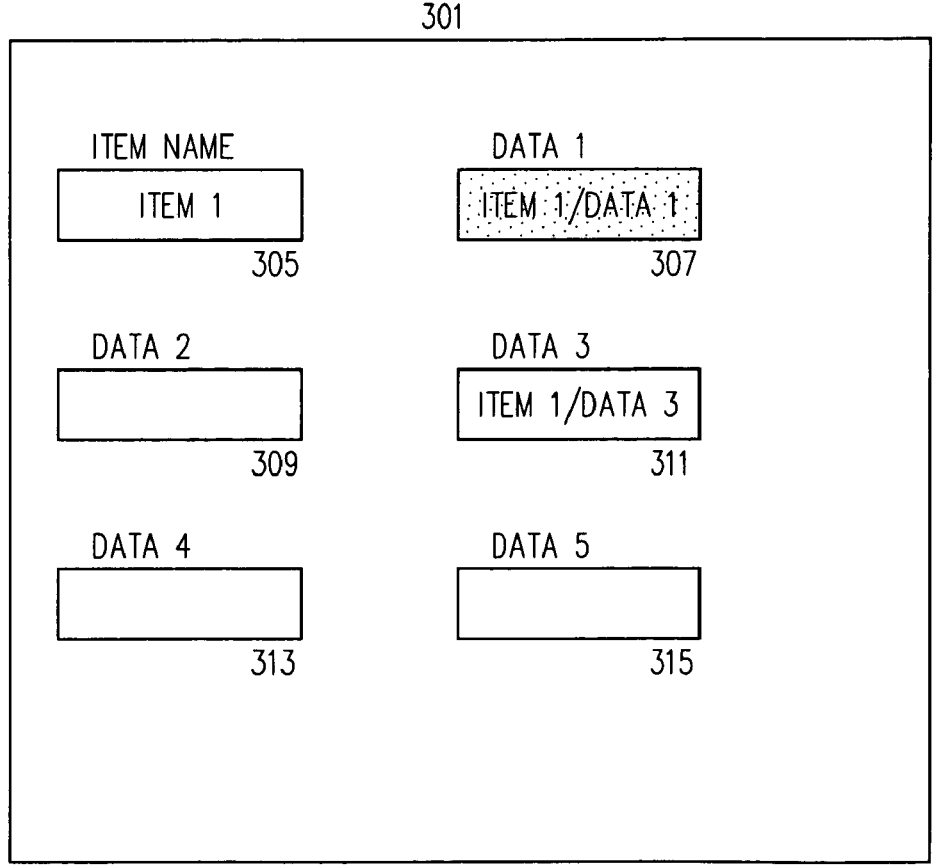
Figure 5J:
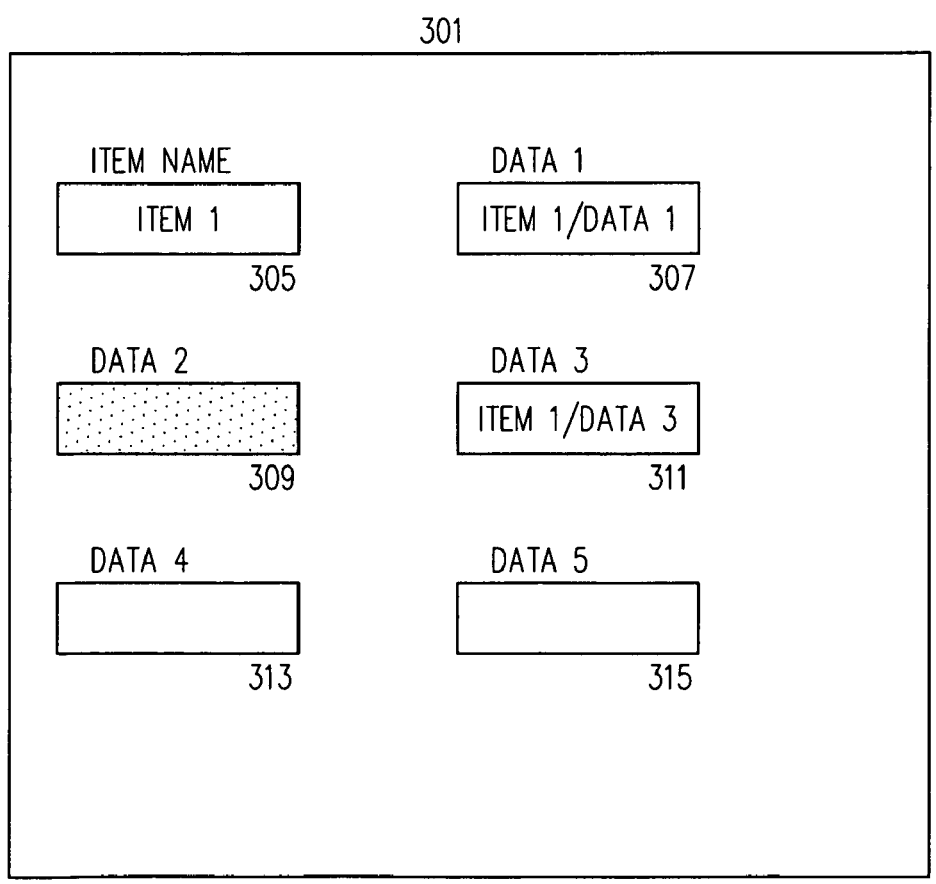
Figure 5K:
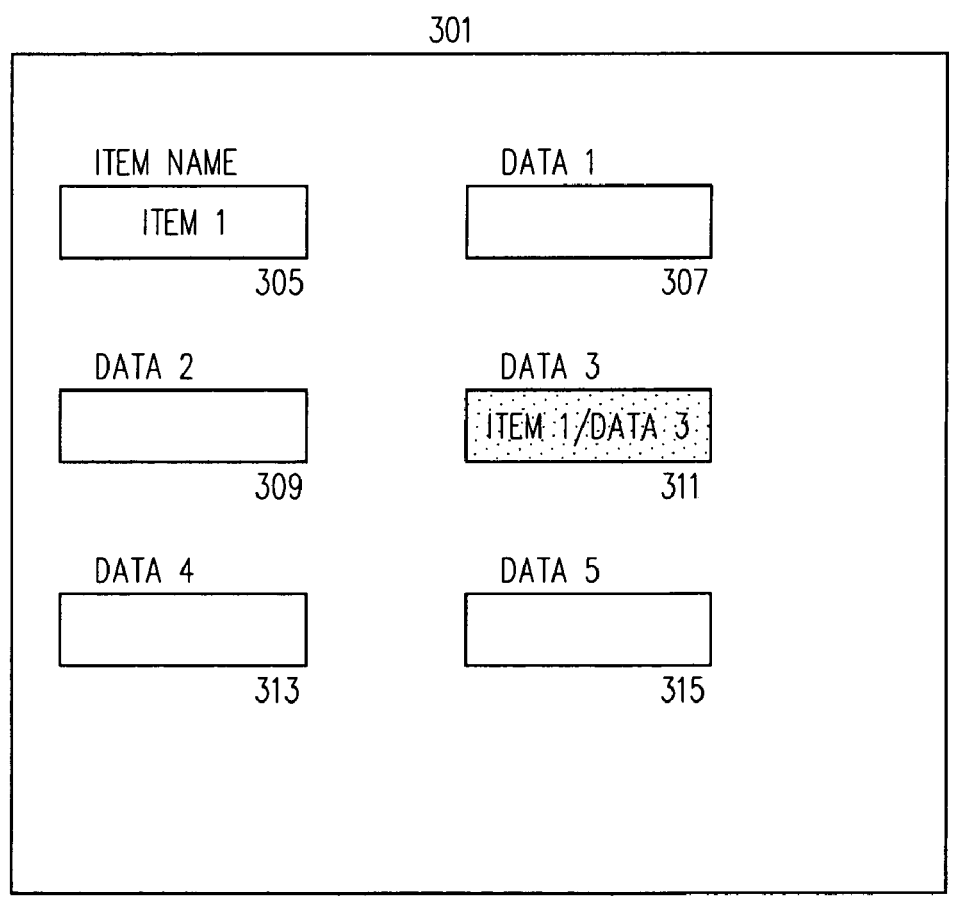
Figure 5L:
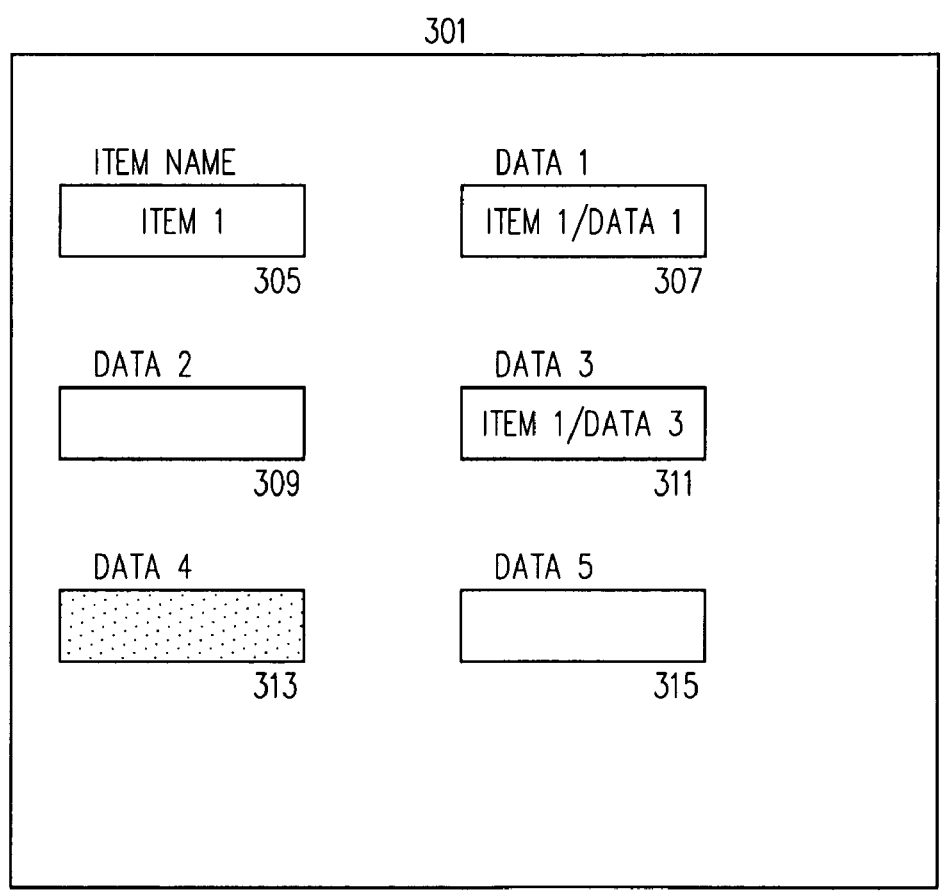

As shown in FIG. 5H by the shading, the user eventually tabs through, or otherwise accesses, DATA 1 entry field 307. The user then enters the data ITEM 1/DATA 1 from column 409 of item 1 row 411 of FIG. 4. As seen in FIG. 4, the user must next enter the data ITEM 1/DATA 5 of column 410 into data entry field 315 of electronic data entry form 301. To this end, the user must access/select data entry field 315 of exemplary electronic data entry form 301. In one embodiment, this is accomplished by tabbing through data entry field 309, data entry field 311, and data entry field 313 of exemplary electronic data entry form 301. This is illustrated in FIGS. 5J, 5K, and 5L with the accessed data entry fields being shaded.

Figure 5M:
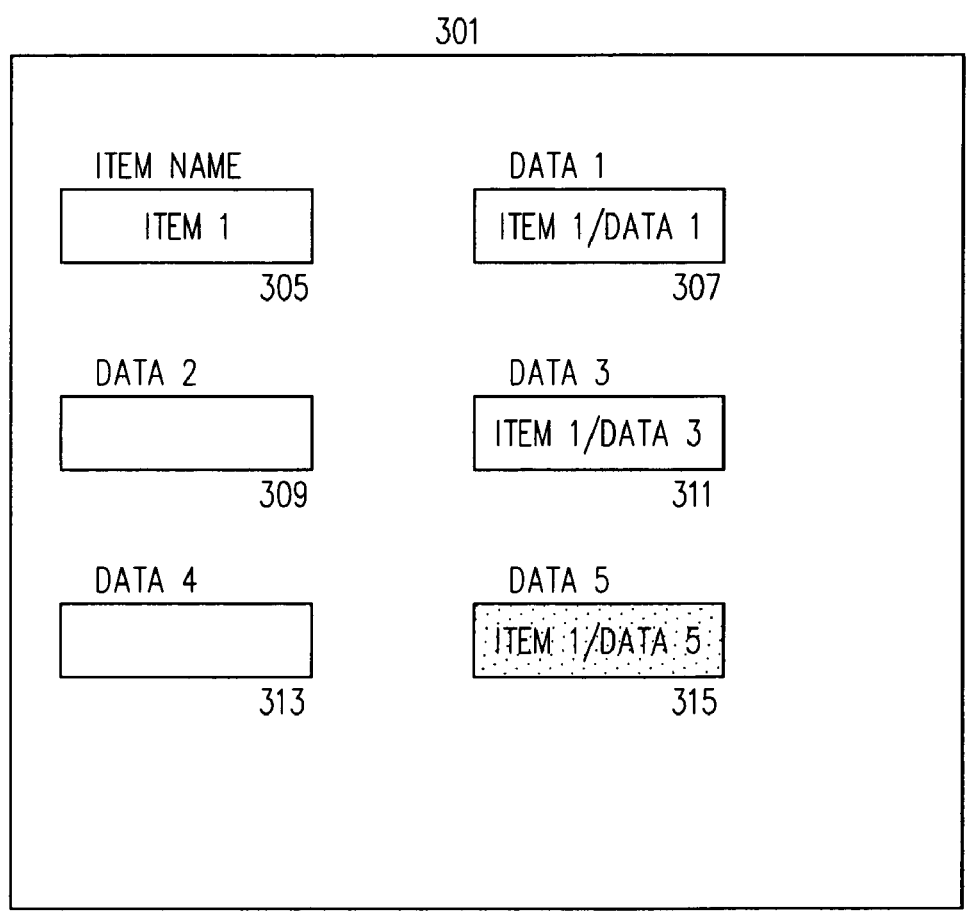

As shown in FIG. 5M by the shading, the user eventually tabs through, or otherwise accesses, DATA 5 entry field 315. The user then enters the data ITEM 1/DATA 5 from column 410 of item 1 row 411 of FIG. 4.

In the example shown above, 13 tabbing actions were performed by the user to make four data entries associated with a single item. Consequently, in this specific example, absent the invention, and using current systems, a minimum of 39 tabbing actions would be required to enter/transfer data for the three items from exemplary electronic data entry form 400 to exemplary electronic data entry form 301. However, as discussed in more detail below, in one embodiment, the sequence of data field access performed above is memorized and used to automatically sequence through the desired data entry fields for all items entered after the first item. Consequently, using process for providing electronic data entry forms with trainable data field sequencing 200, the entire 13 tabbing actions are performed only once, for the first item as described above.

In one embodiment, once the data of OBTAIN DATA ASSOCIATED WITH AT LEAST TWO ITEMS TO BE ENTERED INTO THE DATA ENTRY FORM OPERATION 205 associated with a first item is entered into the electronic data entry form of PROVIDE AN ELECTRONIC DATA ENTRY FORM INCLUDING AT LEAST TWO DATA ENTRY FIELDS OPERATION 203 by sequencing through the data entry fields of the electronic data entry form of PROVIDE AN ELECTRONIC DATA ENTRY FORM INCLUDING AT LEAST TWO DATA ENTRY FIELDS OPERATION 203 at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207, process flow proceeds to OBTAIN DATA REPRESENTING THE SPECIFIC SEQUENCE IN WHICH THE DATA ENTRY FIELDS WERE ACCESSED OPERATION 209.

In one embodiment, at OBTAIN DATA REPRESENTING THE SPECIFIC SEQUENCE IN WHICH THE DATA ENTRY FIELDS WERE ACCESSED OPERATION 209, the specific sequence of data entry field access performed at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207 is obtained.

In one embodiment, the specific sequence of data entry field access performed at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207 is obtained by activating a data field sequencing training mode or feature of the electronic data entry form of PROVIDE AN ELECTRONIC DATA ENTRY FORM INCLUDING AT LEAST TWO DATA ENTRY FIELDS OPERATION 203 prior to, or during, or after the performance of ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207. In one embodiment, the activation of the data field sequencing training mode causes the specific sequence of data entry field access to be memorized/copied.

In one embodiment, the activation of the data field sequencing training mode is accomplished by the user performing a designated action using a user interface device and/or command such as a specific key sequence, vocal command, activation of an icon, or any other method and/or means whereby a user can activate a mode or state of an application/process, whether known at the time of filing or as developed thereafter. In one embodiment, the data field sequencing training mode can be activating and deactivated and multiple specific sequences for multiple electronic data entry forms and/or data listings can be memorized.

As a specific example, referring to FIGS. 3 and 4 again, the sequence of data entry field access in exemplary electronic data entry form 301 for the specific example discussed above could be: data entry field 305, for the Item name data; then directly to data entry field 311, for the data 3 data; then directly to data field 307 for the data 1 data; and finally to data field 315 for the data 5 data. Consequently instead of 13 tabbing actions per item only 4 are required.

In one embodiment, once the specific sequence of data entry field access performed at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207 is obtained at OBTAIN DATA REPRESENTING THE SPECIFIC SEQUENCE IN WHICH THE DATA ENTRY FIELDS WERE ACCESSED OPERATION 209, process flow proceeds to STORE THE DATA REPRESENTING THE SPECIFIC SEQUENCE IN WHICH THE DATA ENTRY FIELDS WERE ACCESSED OPERATION 211.

In one embodiment, at STORE THE DATA REPRESENTING THE SPECIFIC SEQUENCE IN WHICH THE DATA ENTRY FIELDS WERE ACCESSED OPERATION 211, data representing the specific sequence of data entry field access obtained at OBTAIN DATA REPRESENTING THE SPECIFIC SEQUENCE IN WHICH THE DATA ENTRY FIELDS WERE ACCESSED OPERATION 209 is stored, remotely or locally, in whole, or in part, in a database, such as database 170 in FIG. 1, maintained by, accessible by, owned by, or otherwise related to, a provider of process for providing electronic data entry forms with trainable data field sequencing 200 and/or the user, and/or any third party, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memories 103A, 153A of FIG. 1, or in any main memory or mass memory, associated with a computing device, such as computing systems 100, 150 described above. In one embodiment, the data, in whole, or in part, is stored in any computing device and/or server system, such as computing systems 100, 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the data stored as described above is maintained, in whole, or in part, locally or remotely, by: the computing system implemented process provider; the provider of process for providing electronic data entry forms with trainable data field sequencing 200; the user; a third party data storage institution; any third party service or institution; or any other parties.

In one embodiment, once the data representing the specific sequence of data entry field access obtained at OBTAIN DATA REPRESENTING THE SPECIFIC SEQUENCE IN WHICH THE DATA ENTRY FIELDS WERE ACCESSED OPERATION 209 is stored at STORE THE DATA REPRESENTING THE SPECIFIC SEQUENCE IN WHICH THE DATA ENTRY FIELDS WERE ACCESSED OPERATION 211, process flow proceeds to USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213.

In one embodiment, at USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213, the data representing the specific sequence of data entry field accessed obtained at OBTAIN DATA REPRESENTING THE SPECIFIC SEQUENCE IN WHICH THE DATA ENTRY FIELDS WERE ACCESSED OPERATION 209 and stored at STORE THE DATA REPRESENTING THE SPECIFIC SEQUENCE IN WHICH THE DATA ENTRY FIELDS WERE ACCESSED OPERATION 211 is used to directly sequence through the data entry fields in the order desired and without the user needing to tab through any intermediate data entry fields.

As a specific example, referring again to FIGS. 3 and 4 again, the sequence of data entry field access in exemplary electronic data entry form 400 obtained at OBTAIN DATA REPRESENTING THE SPECIFIC SEQUENCE IN WHICH THE DATA ENTRY FIELDS WERE ACCESSED OPERATION 209 and stored at STORE THE DATA REPRESENTING THE SPECIFIC SEQUENCE IN WHICH THE DATA ENTRY FIELDS WERE ACCESSED OPERATION 211 for the specific example discussed above would be used to create the sequence: data entry field 305, for the Item name data; then directly to data entry field 311, for the data 3 data; then directly to data field 307 for the data 1 data; and finally to data field 315 for the data 5 data. Consequently instead of 13 tabbing actions per item only 4 are now required.

In one embodiment, once the data representing the specific sequence of data entry field accessed is used to directly sequence through the required data entry field in the order desired and without the user needing to tab through any intermediate data entry fields at USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213, process flow proceeds to ENTER THE DATA ASSOCIATED WITH THE SECOND ITEM INTO THE AT LEAST TWO DATA ENTRY FIELDS AS THE DATA ENTRY FIELDS ARE AUTOMATICALLY ACCESSED IN THE SPECIFIC SEQUENCE OPERATION 215.

In one embodiment, at ENTER THE DATA ASSOCIATED WITH THE SECOND ITEM INTO THE AT LEAST TWO DATA ENTRY FIELDS AS THE DATA ENTRY FIELDS ARE AUTOMATICALLY ACCESSED IN THE SPECIFIC SEQUENCE OPERATION 215, as the data entry fields are accessed in the sequence of USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213, the appropriate data is entered/transferred into the data fields and a specific example.

FIGS. 6A to 6D illustrate one embodiment of the functioning of USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213 and ENTER THE DATA ASSOCIATED WITH THE SECOND ITEM INTO THE AT LEAST TWO DATA ENTRY FIELDS AS THE DATA ENTRY FIELDS ARE AUTOMATICALLY ACCESSED IN THE SPECIFIC SEQUENCE OPERATION 215 in accordance with one embodiment.

Referring to FIGS. 4 and 6A to 6D together, it is again worth noting that in this specific example, the data, data 3, data 1, and data 5 associated with the specific items, Item 1, Item 2 and Item 3 of exemplary electronic data entry form 400 is listed in the order data 3, data 1, and data 5. In contrast, as discussed above, data 1, data 2, data 3, data 4 and data 5 would be accessed sequentially absent the invention, using current systems. As a result, the data listed in exemplary electronic data entry form 400 is not in the same formatting sequence as the data entry field of exemplary electronic data entry form 301.

Figure 6A:
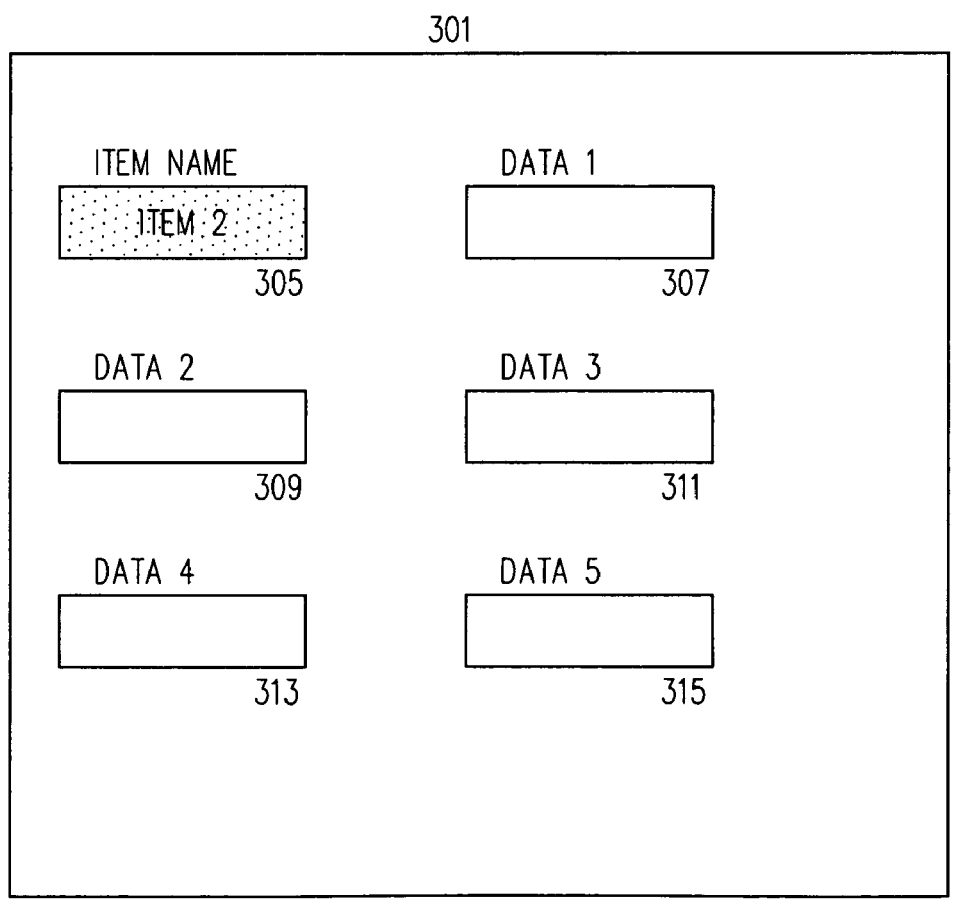
FIGS. 6A to 6D are a representation of an exemplary specific sequence of data entry field access and data entry as would be performed for a second and subsequent items in accordance with one embodiment.

Referring to FIG. 4 and FIG. 6A together, FIG. 6A shows exemplary electronic data entry form 301 including ITEM NAME data entry field 305. In this example, the data for item 1 has already been entered in the proper sequence at ENTER DATA ASSOCIATED WITH A FIRST ITEM INTO THE AT LEAST TWO DATA ENTRY FIELDS BY ACCESSING THE AT LEAST TWO DATA ENTRY FIELDS IN A SPECIFIC SEQUENCE OPERATION 207 and the specific sequence of data entry field access had been obtained at OBTAIN DATA REPRESENTING THE SPECIFIC SEQUENCE IN WHICH THE DATA ENTRY FIELDS WERE ACCESSED OPERATION 209 and stored at STORE THE DATA REPRESENTING THE SPECIFIC SEQUENCE IN WHICH THE DATA ENTRY FIELDS WERE ACCESSED OPERATION 211.

As shown in FIG. 6A by the shading, using process for providing electronic data entry forms with trainable data field sequencing 200, ITEM NAME data entry field 305 is first accessed and the data ITEM 2 from column 405 of item 2 row 413 of FIG. 4 has been entered.

Figure 6B:
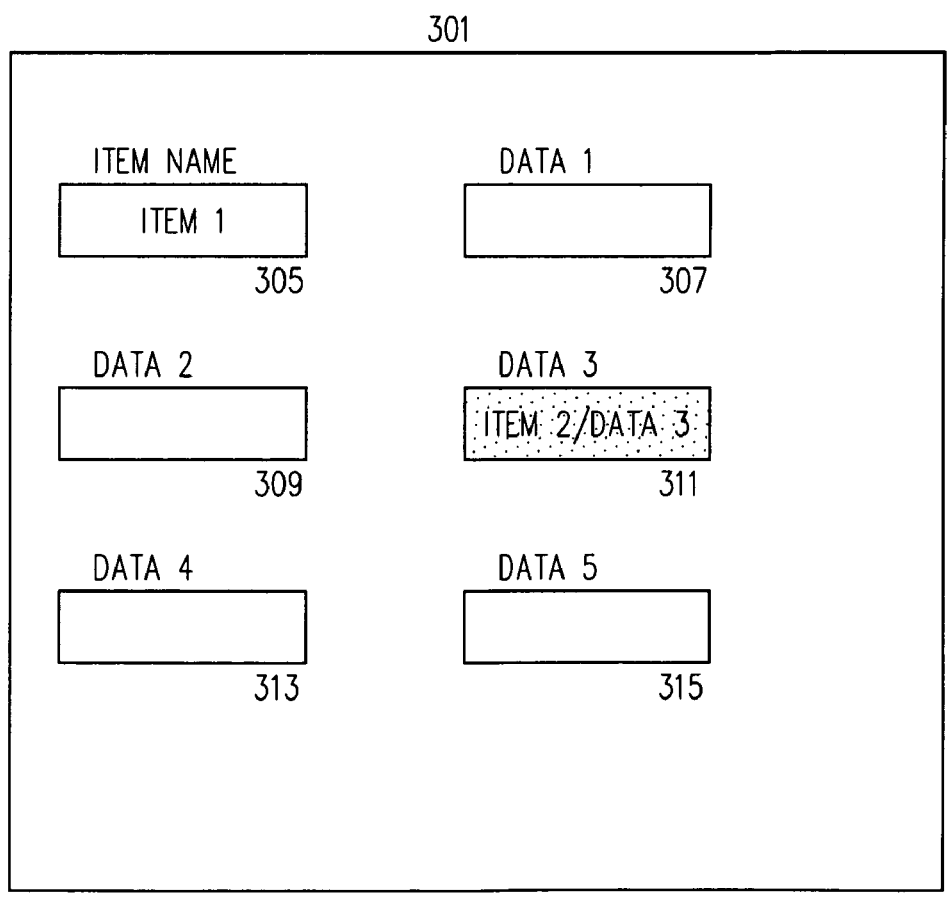
Figure 6C:
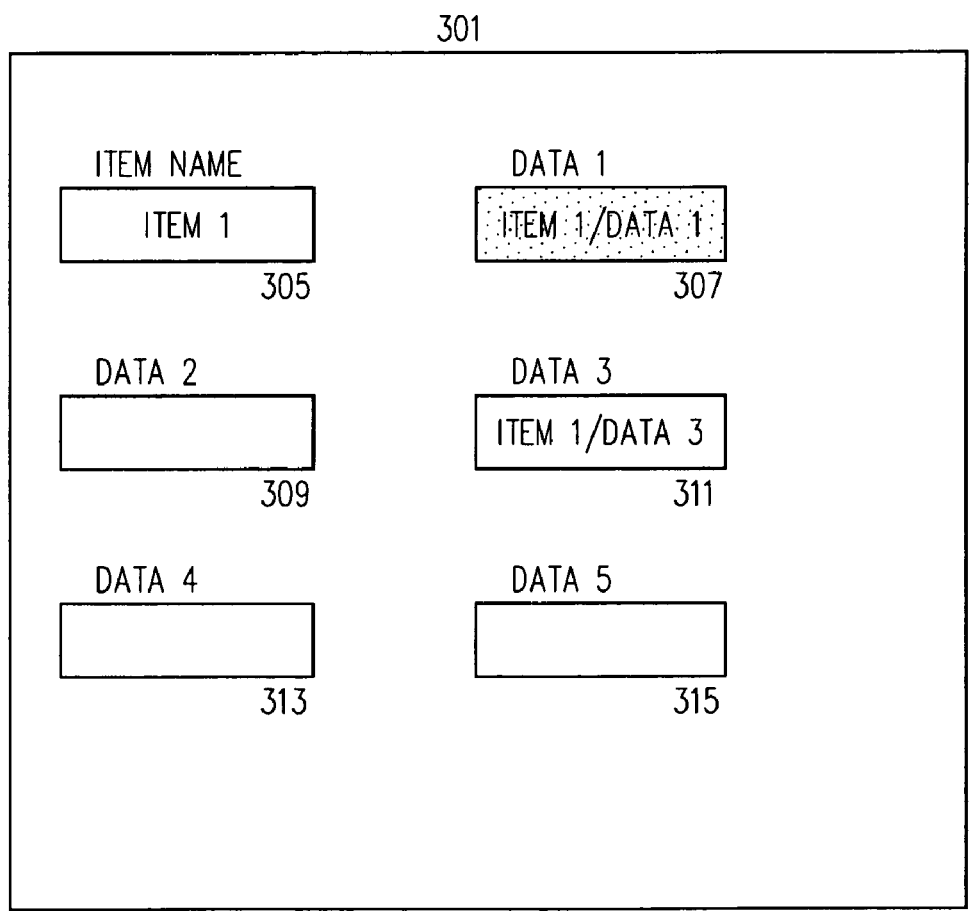
Figure 6D:
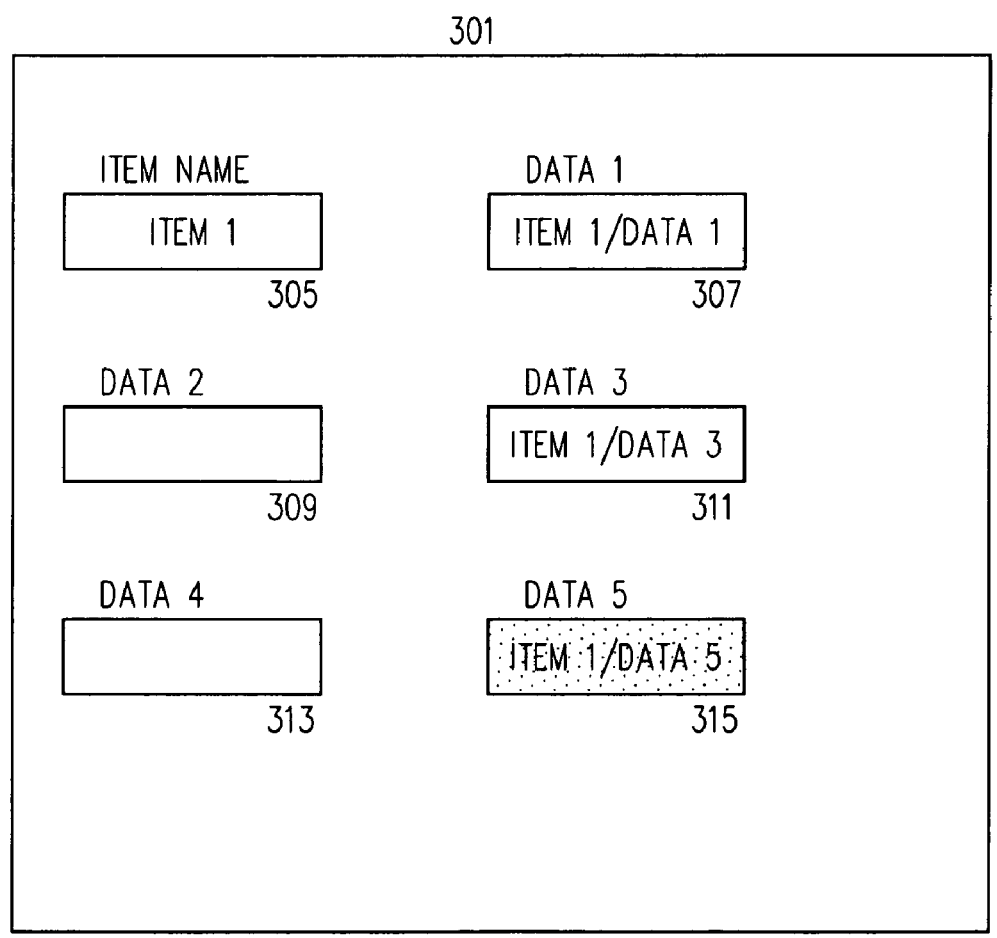

As shown in FIG. 6B, using process for providing electronic data entry forms with trainable data field sequencing 200, DATA 3 entry field 311 is then directly accessed. The user then enters the data ITEM 2/DATA 3 from column 407 of item 2 row 413 of FIG. 4. Likewise, as shown in FIG. 6C by the shading, using process for providing electronic data entry forms with trainable data field sequencing 200, DATA 1 entry field 307 is then directly accessed. The user then enters the data ITEM 2/DATA 1 from column 409 of item 2 row 413 of FIG. 4. Likewise, as shown in FIG. 6D by the shading, using process for providing electronic data entry forms with trainable data field sequencing 200, DATA 5 entry field 315 is then directly accessed. The user then enters the data ITEM 2/DATA 5 from column 410 of item 2 row 413 of FIG. 4. Consequently, using process for providing electronic data entry forms with trainable data field sequencing 200, the 13 tabbing actions that would have been required for each item are reduced to 4 actions for data associated with all items entered after the first item using currently available systems/processes. When numerous items are being processed this savings in time and user action can be very significant.

In one embodiment, once USE THE DATA REPRESENTING THE SPECIFIC SEQUENCE IN WHICH THE DATA ENTRY FIELDS WERE ACCESSED FOR THE FIRST ITEM TO AUTOMATICALLY ACCESSES THE DATA ENTRY FIELDS IN THE SAME SEQUENCE FOR THE SECOND ITEM OPERATION 213 and the appropriate data is entered/transferred into the data fields at ENTER THE DATA ASSOCIATED WITH THE SECOND ITEM INTO THE AT LEAST TWO DATA ENTRY FIELDS AS THE DATA ENTRY FIELDS ARE AUTOMATICALLY ACCESSED IN THE SPECIFIC SEQUENCE OPERATION 215, process flow proceeds to END OPERATION 230 and process for providing electronic data entry forms with trainable data field sequencing 200 is exited to await the next item and/or a new training activation action.

In one embodiment, once a specific data entry field access sequence for a given electronic data entry form is obtained at OBTAIN DATA REPRESENTING THE SPECIFIC SEQUENCE IN WHICH THE DATA ENTRY FIELDS WERE ACCESSED OPERATION 209 and stored at STORE THE DATA REPRESENTING THE SPECIFIC SEQUENCE IN WHICH THE DATA ENTRY FIELDS WERE ACCESSED OPERATION the specific data entry field access sequence for the given electronic data entry form can be activated and deactivated as needed. In one embodiment, the specific sequence in which the data entry fields are accessed for a given electronic data entry form is linked to the specific electronic data entry form so that the specific sequence in which the data entry fields are accessed for that form become available each time the form is used/activated. In one embodiment, multiple specific data entry field access sequences for multiple electronic data entry forms are obtained and stored using process for providing electronic data entry forms with trainable data field sequencing 200 according to the needs of the user.

Using process for providing electronic data entry forms with trainable data field sequencing 200, the user is no longer required to repetitively sequence, or tab, through multiple intermediate data entry fields in order to access a desired data entry field for each and every item entered into a data base and/or computing system implemented process. Consequently, using process for providing electronic data entry forms with trainable data field sequencing 200, a significant source of inefficiency and lost/wasted man-hours is eliminated.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For instance, those of skill in the art will readily recognize that the order of operations discussed above was presented for illustrative purposes only and that other orders of operations, and combination of operations, are possible. Consequently, the order of operations discussed above does not limit the invention as claimed.

In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in some embodiments, be performed by multiple components, and functions performed by multiple components may, in some embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "obtaining", "entering", "accessing", "selecting", "listing", "storing", "using", "displaying", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are shown in an exemplary order for ease of description and understanding.

However, those of skill in the art will readily recognize that numerous different orders of operation could be employed. Consequently, the order of operations shown in the FIG.s is illustrative only and does not limit the invention as claimed below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for providing electronic data entry forms with trainable data field sequencing comprising:
   an electronic data entry form creator creating an electronic data entry form, the electronic data entry form including at least two data entry fields;
   providing a user a first copy of the electronic data entry form through a computing system implemented process, the user and the electronic data entry form creator being two different parties;
   the user accessing the at least two data entry fields of the first copy of the electronic data entry form in a specific sequence to enter at least part of first item data associated with a first item, the first item data to be entered as at least two first data entries into the at least two data entry fields of the first copy of the electronic data entry form;
   obtaining sequencing data representing the specific sequence in which the at least two data entry fields were accessed to enter the at least two first data entries in the first copy of the electronic data entry form;
   providing a second copy of the electronic data entry form;
   using the sequencing data representing the specific sequence in which the at least two data entry fields were accessed by the user to enter the at least two first data entries in the first copy of the electronic data entry form to access the at least two data entry fields of the second copy of the electronic data entry form in the specific sequence in which the at least two data entry fields were accessed by the user to enter the at least two first data entries in the first copy of the electronic data entry form to enter at least part of second item data associated with a second item, the second item data to be entered as at least two second data entries into the at least two data entry fields of the second copy of the electronic data entry form.

2. The computing system implemented process for providing electronic data entry forms with trainable data field sequencing of claim 1, wherein;
   the computing system implemented process is a computing system implemented inventory management system.

3. The computing system implemented process for providing electronic data entry forms with trainable data field sequencing of claim 1, wherein;
   the first item data and the second item data are obtained from a shipping document.

4. The computing system implemented process for providing electronic data entry forms with trainable data field sequencing of claim 1, wherein;
   accessing the at least two data entry fields of the first and second copies of the electronic data entry form is performed by a predefined user action through a user interface device.

5. The computing system implemented process for providing electronic data entry forms with trainable data field sequencing of claim 4, wherein;
   the user interface device is a keyboard and the user action is a tabbing action.

6. A computing system implemented process for providing electronic data entry forms with trainable data field sequencing comprising:
   an electronic data entry form creator creating an electronic data entry form, the electronic data entry form including at least two data entry fields;
   providing a user a first copy of the electronic data entry form through a computing system implemented process, the user and the electronic data entry form creator being two different parties;
   activating a data field sequence training mode for the electronic data entry form;
   the user accessing the at least two data entry fields of the first copy of the electronic data entry form to enter the at least two first data entries into the at least two data entry fields of the first copy of the electronic data entry form in a specific sequence;
   obtaining sequencing data representing the specific sequence in which the at least two data entry fields were accessed to enter the at least two first data entries into the at least two data entry fields of the first copy of the electronic data entry form;
   providing a second copy of the electronic data entry form; and
   using the sequencing data representing the specific sequence in which the at least two data entry fields of the first copy of the electronic data entry form were accessed by the user for the first item data to access the at least two data entry fields of the second copy of the electronic data entry form in the same specific sequence to enter the data associated with a second item.

7. The computing system implemented process for providing electronic data entry forms with trainable data field sequencing of claim 6, wherein;
   accessing the at least two data entry fields of the first and second copies of the electronic data entry form is performed by a predefined user action through a user interface device.

8. The computing system implemented process for providing electronic data entry forms with trainable data field sequencing of claim 7, wherein;
   the user interface device is a keyboard and the user action is a tabbing action.

9. The computing system implemented process for providing electronic data entry forms with trainable data field sequencing of claim 6, wherein;
   activating a data field sequence training mode for the electronic data entry form comprises the user taking a predefined action through a user interface device.

10. The computing system implemented process for providing electronic data entry forms with trainable data field sequencing of claim 6, wherein;
    the obtained sequencing data representing the specific sequence in which the at least two data entry fields were accessed by the user to enter the at least two first data entries is stored for future use and the sequencing data is linked with the electronic data entry form.

11. A system for providing electronic data entry forms with trainable data field sequencing comprising:
    a computing system implementing a computing system implemented process;

at least one electronic data entry form, the at least one electronic data entry form being created by a an electronic data entry form creator and provided through the computing system implemented process; and at least one processor associated with at least one computing system, the at least one processor executing at least part of a process for providing electronic data entry forms with trainable data field sequencing, the process for providing electronic data entry forms with trainable data field sequencing comprising:

providing a first copy of the electronic data entry form to a user, the user and the electronic data entry form creator being two different parties;

the user accessing the at least two data entry fields of the first copy of the electronic data entry form in a specific sequence to enter at least part of first item data associated with a first item, the first item data to be entered as at least two first data entries into the at least two data entry fields of the first copy of the electronic data entry form;

obtaining sequencing data representing the specific sequence in which the at least two data entry fields were accessed by the user to enter the at least two first data entries in the first copy of the electronic data entry form;

providing a second copy of the electronic data entry form;

using the sequencing data representing the specific sequence in which the at least two data entry fields were accessed by the user to enter the at least two first data entries in the first copy of the electronic data entry form to access the at least two data entry fields of the second copy of the electronic data entry form in the specific sequence in which the at least two data entry fields were accessed to enter the at least two first data entries in the first copy of the electronic data entry form to enter at least part of second item data associated with a second item, the second item data to be entered as at least two second data entries into the at least two data entry fields of the second copy of the electronic data entry form.

12. The system for providing electronic data entry forms with trainable data field sequencing of claim 11, wherein;
the computing system implemented process is a computing system implemented inventory management system.

13. The system for providing electronic data entry forms with trainable data field sequencing of claim 11, wherein;
the first item data and the second item data are obtained from a shipping document.

14. The system for providing electronic data entry forms with trainable data field sequencing of claim 11, wherein;
accessing the at least two data entry fields of the first and second copies of the electronic data entry form is performed by a predefined user action through a user interface device.

15. The system for providing electronic data entry forms with trainable data field sequencing of claim 14, wherein;
the user interface device is a keyboard and the user action is a tabbing action.

16. A system for providing electronic data entry forms with trainable data field sequencing comprising:
a computing system implementing a computing system implemented process;
at least one electronic data entry form, the at least one electronic data entry form being created by a an electronic data entry form creator and provided through the computing system implemented process; and
at least one processor associated with at least one computing system, the at least one processor executing at least part of a process for providing electronic data entry forms with trainable data field sequencing, the process for providing electronic data entry forms with trainable data field sequencing comprising:
activating a data field sequence training mode for the electronic data entry form;
a user accessing the at least two data entry fields of the first copy of the electronic data entry form to enter the at least two first data entries into the at least two data entry fields of the first copy of the electronic data entry form in a specific sequence, the user and the electronic data entry form creator being two different parties;
obtaining sequencing data representing the specific sequence in which the at least two data entry fields were accessed by the user to enter the at least two first data entries into the at least two data entry fields of the first copy of the electronic data entry form;
providing a second copy of the electronic data entry form; and
using the sequencing data representing the specific sequence in which the at least two data entry fields of the first copy of the electronic data entry form were accessed for the first item data to access the at least two data entry fields of the second copy of the electronic data entry form in the same specific sequence to enter the data associated with a second item.

17. The system for providing electronic data entry forms with trainable data field sequencing of claim 16 wherein:
accessing the at least two data entry fields of the first and second copies of the electronic data entry form is performed by a predefined user action through a user interface device.

18. The system for providing electronic data entry forms with trainable data field sequencing of claim 17 wherein:
the user interface device is a keyboard and the user action is a tabbing action.

19. The system for providing electronic data entry forms with trainable data field sequencing of claim 16 wherein:
activating a data field sequence training mode for the electronic data entry form comprises the user taking a predefined action through a user interface device.

20. The system for providing electronic data entry forms with trainable data field sequencing of claim 16 wherein:
the obtained sequencing data representing the specific sequence in which the at least two data entry fields were accessed by the user to enter the at least two first data entries is stored for future use and the sequencing data is linked with the electronic data entry form.

21. A method for providing electronic data entry forms with trainable data field sequencing comprising:
an electronic data entry form creator creating an electronic data entry form, the electronic data entry form including at least two data entry fields;
providing a user a first copy of the electronic data entry form through a computing system implemented process, the user and the electronic data entry form creator being two different parties;
the user accessing the at least two data entry fields of the first copy of the electronic data entry form in a specific sequence to enter at least part of first item data associated with a first item, the first item data to be entered as at least two first data entries into the at least two data entry fields of the first copy of the electronic data entry form;
obtaining sequencing data representing the specific sequence in which the at least two data entry fields were accessed by the user to enter the at least two first data entries in the first copy of the electronic data entry form;

providing a second copy of the electronic data entry form;

using the sequencing data representing the specific sequence in which the at least two data entry fields were accessed to enter the at least two first data entries in the first copy of the electronic data entry form to access the at least two data entry fields of the second copy of the electronic data entry form in the specific sequence in which the at least two data entry fields were accessed to enter the at least two first data entries in the first copy of the electronic data entry form to enter at least part of second item data associated with a second item, the second item data to be entered as at least two second data entries into the at least two data entry fields of the second copy of the electronic data entry form.

22. The method for providing electronic data entry forms with trainable data field sequencing of claim 21, wherein;

the computing system implemented process is a computing system implemented inventory management system.

23. The method for providing electronic data entry forms with trainable data field sequencing of claim 21, wherein;

the first item data and the second item data are obtained from a shipping document.

24. The method for providing electronic data entry forms with trainable data field sequencing of claim 21, wherein;

accessing the at least two data entry fields of the first and second copies of the electronic data entry form is performed by a predefined user action through a user interface device.

25. The method for providing electronic data entry forms with trainable data field sequencing of claim 24, wherein;

the user interface device is a keyboard and the user action is a tabbing action.

26. A method for providing electronic data entry forms with trainable data field sequencing comprising:

an electronic data entry form creator creating an electronic data entry form, the electronic data entry form including at least two data entry fields;

providing a user a first copy of the electronic data entry form through a computing system implemented process, the user and the electronic data entry form creator being two different parties;

activating a data field sequence training mode for the electronic data entry form;

the user accessing the at least two data entry fields of the first copy of the electronic data entry form to enter the at least two first data entries into the at least two data entry fields of the first copy of the electronic data entry form in a specific sequence;

obtaining sequencing data representing the specific sequence in which the at least two data entry fields were accessed by the user to enter the at least two first data entries into the at least two data entry fields of the first copy of the electronic data entry form;

providing a second copy of the electronic data entry form; and using the sequencing data representing the specific sequence in which the at least two data entry fields of the first copy of the electronic data entry form were accessed for the first item data to access the at least two data entry fields of the second copy of the electronic data entry form in the same specific sequence to enter the data associated with a second item.

27. The method for providing electronic data entry forms with trainable data field sequencing of claim 26, wherein;

accessing the at least two data entry fields of the first and second copies of the electronic data entry form is performed by a predefined user action through a user interface device.

28. The method for providing electronic data entry forms with trainable data field sequencing of claim 27, wherein;

the user interface device is a keyboard and the user action is a tabbing action.

29. The method for providing electronic data entry forms with trainable data field sequencing of claim 26, wherein;

activating a data field sequence training mode for the electronic data entry form comprises the user taking a predefined action through a user interface device.

30. The method for providing electronic data entry forms with trainable data field sequencing of claim 26, wherein;

the obtained sequencing data representing the specific sequence in which the at least two data entry fields were accessed by the user to enter the at least two first data entries is stored for future use and the sequencing data is linked with the electronic data entry form.

* * * * *